(12) United States Patent
Grobelny et al.

(10) Patent No.: US 11,495,121 B2
(45) Date of Patent: Nov. 8, 2022

(54) SYSTEMS AND METHODS FOR DETECTING CHASSIS INTRUSION AND/OR TAMPERING EVENTS IN BATTERY-POWERED INFORMATION HANDLING SYSTEMS

(71) Applicant: DELL PRODUCTS L.P., Round Rock, TX (US)

(72) Inventors: Nicholas D. Grobelny, Austin, TX (US); Geroncio O. Tan, Austin, TX (US); Richard C. Thompson, Cedar Park, TX (US); Adolfo S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 198 days.

(21) Appl. No.: 16/746,260

(22) Filed: Jan. 17, 2020

(65) Prior Publication Data

US 2021/0225159 A1 Jul. 22, 2021

(51) Int. Cl.
| | |
|---|---|
| *G08B 29/16* | (2006.01) |
| *G08B 21/18* | (2006.01) |
| *H01M 50/20* | (2021.01) |
| *G06F 9/4401* | (2018.01) |

(52) U.S. Cl.
CPC .......... *G08B 29/16* (2013.01); *G06F 9/4401* (2013.01); *G08B 21/18* (2013.01); *H01M 50/20* (2021.01)

(58) Field of Classification Search
CPC ....... G08B 29/16; G08B 21/18; H01M 50/20; G06F 9/4401
See application file for complete search history.

(56) References Cited

U.S. PATENT DOCUMENTS

| | | | |
|---|---|---|---|
| 6,191,503 B1 | 2/2001 | Kitten et al. | |
| 6,564,276 B1 * | 5/2003 | Tyner | G06F 21/71 |
| | | | 710/260 |
| 7,436,149 B2 | 10/2008 | Luo et al. | |

(Continued)

OTHER PUBLICATIONS

Tan et al., "Systems And Methods For Detecting Battery Removal While An Information Handling System Is In An Off State", U.S. Appl. No. 16/864,933, filed May 1, 2020, 45 pgs.

*Primary Examiner* — Kam Wan Ma
(74) *Attorney, Agent, or Firm* — Egan, Enders & Huston LLP.

(57) ABSTRACT

Systems and methods that may be implemented to employ a programmable integrated circuit within a smart battery pack to detect and/or log occurrence of chassis intrusion and/or tampering events in a battery-powered information handling system within which the smart battery pack is installed. A battery management unit (BMU) or other programmable integrated circuit of the installed smart battery pack may be utilized to detect occurrence of a tampering and/or intrusion event into the chassis of the host information handling system based on a current state of a system present (Sys_Pres) signal at the battery pack that indicates temporary or permanent disconnection of system motherboard circuitry from the smart battery pack of the battery-powered information handling system. Such a detected occurrence of a tampering and/or intrusion event may be reported to a remote human user of remote system and/or to a local human user of the local system.

13 Claims, 15 Drawing Sheets

(56) References Cited

U.S. PATENT DOCUMENTS

| | | |
|---|---|---|
| 7,595,609 B2 | 9/2009 | Wang et al. |
| 8,154,255 B2 | 4/2012 | Wang et al. |
| 9,496,932 B1 | 11/2016 | Prendergast et al. |
| 10,491,014 B2 | 11/2019 | Chang et al. |
| 10,496,509 B2 | 12/2019 | Thompson et al. |
| 10,496,854 B1 * | 12/2019 | Lillestolen ............. H05K 1/165 |
| 2010/0019730 A1 * | 1/2010 | Chueh ................... H02J 7/0031 |
| | | 320/135 |
| 2018/0246552 A1 * | 8/2018 | Thompson .......... G06F 11/3093 |

* cited by examiner

SYSTEMS AND METHODS FOR DETECTING CHASSIS INTRUSION AND/OR TAMPERING EVENTS IN BATTERY-POWERED INFORMATION HANDLING SYSTEMS

FIELD

This invention relates generally to information handling systems and, more particularly, to chassis intrusion and/or tampering detection for battery-powered information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Personal computer users and information technology administrators are at risk of various security vulnerabilities when systems are computer systems are left unattended. An adversary with physical access to a laptop computer can unscrew the chassis cover, and subsequently modify or implant malware in various sensitive storage components such as the BIOS flash or other mass storage devices within seconds. Additionally, after such an intrusion event, attackers can "cover their tracks" by clearing logs, clearing intrusion flags, removing the battery to reset battery-backed logic on the motherboard, and so forth.

As such, laptop physical tamper and intrusion attacks undermine firmware and software protections. However, existing tamper mitigation technology adds undesirable complexity and cost to base configurations. Existing chassis intrusion switches burden the motherboard with additional component costs (i.e., soldered down switch on motherboard, or a connector for a module on the motherboard). Chassis intrusion switches with battery-backed latching logic are known.

SUMMARY

Disclosed herein are systems and methods that may be implemented to employ a programmable integrated circuit of a smart battery system (e.g., single integrated battery pack or separate battery system modules) to detect and/or log occurrence of chassis intrusion and/or tampering events in a battery-powered information handling system enclosure within which the smart battery system is installed. In one embodiment, the disclosed systems and methods may utilize a battery management unit (BMU) or other programmable integrated circuit of the installed smart battery system to battery management tasks that include detecting occurrence of a tampering and/or intrusion event into the chassis of the host information handling system based on a current state of a system present (Sys_Pres) signal at the battery system that indicates temporary or permanent disconnection of system motherboard circuitry from the smart battery system of the battery-powered information handling system. Such a detected occurrence of a tampering and/or intrusion event may be reported to a remote human user of remote system and/or local human user of the local system.

In one embodiment, such a smart battery system may be an integrated self-contained smart battery pack having one or more rechargeable battery cells and at least one programmable integrated circuit such as a battery management unit (BMU) that are integrated together within a single battery pack enclosure. In one such embodiment, a BMU may be programmed to implement battery protection and battery gauging functions together with chassis intrusion and/or tampering detection tasks. Besides a battery management programmable integrated circuit and battery cell/s, such a single battery pack enclosure may also include other battery pack components such data buses, power buses, charge/discharge switch circuitry, battery pack connectors, etc.

In another embodiment, one or more battery management functions may be implemented together with chassis intrusion and/or tampering detection by one or more programmable integrated circuits that are positioned separate and remote from other components (e.g., rechargeable battery cell/s, data buses, power buses, charge/discharge switch circuitry, battery pack connectors, etc.) of a core battery pack unit. In one such embodiment, a battery management programmable integrated circuit (e.g., implementing one or more functions of a BMU) may be positioned separate from and outside a battery pack enclosure that contains battery cells and/or other battery system components. For example, a battery management programmable integrated circuit may be integrated on a system motherboard separate from a battery pack enclosure, and/or multiple battery pack enclosures (e.g., each including a separate set of battery cells) may be connected to a single battery management programmable integrated circuit that implements a master battery gauge and chassis intrusion and tampering detection features.

In one embodiment, a battery system may be implemented using multiple separate battery pack enclosure modules (i.e., each including its own battery cell/s) coupled to a common battery management programmable integrated circuit. In such a case, battery protection functions (e.g., voltage monitor, temperature monitor, current monitor, etc.) may be implemented together with system present signal, and an authentication function on each separate battery pack enclosure module. Thus, logic implementing battery management and chassis intrusion/tamper detection may be executed by a programmable integrated circuit that is collocated with (and integrated with) the other battery system components (including battery cell/s and switching circuitry) of a battery pack, or may be executed by a programmable integrated circuit that is distributed and located remotely from other battery system components such as battery cell/s and switching circuitry.

In one exemplary embodiment, a Sys_Pres signal may be routed through an inline chassis intrusion ON-OFF switch from system motherboard circuitry to a battery management unit (BMU) of an internal smart battery system of a battery-powered information handling system. The inline chassis intrusion switch may be positioned within a chassis of the battery-powered information handling system to be closed or turned "ON" to conduct the Sys_Pres signal from the motherboard circuitry to the BMU as long as the chassis remains intact (or otherwise untampered with), and to be actuated to open or turn "OFF" to interrupt conductance of the Sys_Pres signal to the BMU upon opening of the chassis or other mechanical tampering with the chassis that results in mechanical actuation of the switch to turn "OFF" the chassis intrusion switch. For example, in one embodiment an inline chassis intrusion switch may be positioned inside the system chassis such that the act of opening a lid (or other type of access cover) or otherwise accessing interior of the chassis serves to actuate and turn "OFF" the switch so as to interrupt conductance of the Sys_Pres signal from the motherboard circuitry to the BMU.

In a further embodiment, the system BMU may be programmed to log the occurrence of such a Sys_Pres signal interruption due to chassis intrusion or tampering, e.g., on non-volatile memory (NVM) of the smart battery system. For example, the BMU may respond to interruption of the Sys_Pres signal by storing a disconnect indicator on the battery NVM of the smart battery system, e.g., such as by setting a battery disconnect (Bat_Disc) flag value maintained on the battery NVM to true and/or by incrementing a battery disconnect counter value (e.g., monotonic counter) maintained on the battery NVM once per disconnect event. Although such a battery disconnect counter value may be sequential, it may alternatively be a randomized or pseudo-random ephemeral secret (e.g., such as keys, etc.). Once the occurrence of a chassis intrusion or tampering event has been logged on battery system NVM, a local and/or remote user may be notified of the chassis intrusion or tampering event occurrence.

In one exemplary embodiment, a disconnect counter may be implemented such that it cannot be cleared by an attacker, i.e., a battery disconnect counter value that is stored in the battery system NVM may not be easily (if at all) rolled back, which deters or thwarts attempts by a local adversary to "cover their tracks" by erasing or otherwise altering the battery disconnect value stored in the battery system NVM. For example, a counter employing a pseudo-random ephemeral secret or a monotonic counter may be implemented so that an adversary's tamper activity will always force the secret to be erased (or the counter to be altered), and such that it cannot be restored to the value that existed before the tamper/intrusion event was detected. In the case of a pseudo-random ephemeral secret, an attacker will not know the secret, cannot read the secret, and cannot force the device to restore a previously erased secret. In the case of a monotonic counter, a perfect counter may be implemented so that it only increments to a new value (i.e., and so that it cannot return to an old value), and thus, it cannot be returned to the state prior to the tamper/intrusion event. In either case, an adversary will not be able to "cover their tracks" by returning the value stored in the BMU or other battery management integrated circuit memory to the previous untampered state.

In one exemplary embodiment, the state of a battery disconnect (e.g., Batt_Disc) flag maintained on battery NVM may be checked by logic executing on a programmable integrated circuit of the battery-powered information handling system, e.g., such as by basic input/output system (BIOS) programming and/or other logic executing on an embedded controller (EC) of the information handling system. If the Batt_Disc flag is found set in the battery NVM, the BIOS may provide a local user notification to a local human user of the battery-powered information handling system, e.g., by causing display of an alert on a local display device of the system (or by outputting an audio alert on a local system speaker) that indicates to the user that a chassis intrusion or tampering event has occurred.

In another exemplary embodiment, a remote information handling system may query the programmable integrated circuit (e.g., BMU or separate battery management programmable integrated circuit) of the smart battery system of a local (e.g., client) battery-powered information handling system across a network to determine the current state of the Batt_Disc flag and/or battery disconnect counter value stored on the NVM of the smart battery system. In one exemplary embodiment, the remote information handling system may be a remote console (e.g., remote administrator system such as a remote server) that is physically separate from the local information handling system and communicatively coupled to the local information system by a network such as the Internet, corporate intranet, etc. Such a remote query may be made to the BMU across a network using public key infrastructure (PKI) encryption or other encryption scheme for purposes of integrity and/or anti-replay protection (e.g., using rolling keys), and the remote query may be made to the smart battery system through suitable hardware and/or logic of the local information handling system, e.g., such as an EC, system BIOS, Agent, etc.

In one exemplary embodiment, a remote query may be a nonce-based message signed with a public key that is decrypted by the BMU when received using a corresponding assigned private key that is unique to the BMU, and in one exemplary embodiment providing anti-replay protection. In one exemplary embodiment, PKI encryption may be implemented by the BMU using elliptic-curve cryptography (ECC) keys stored on battery system NVM to allow for hardened verification of a remote query, e.g., to mitigate both chassis intrusion or chassis tampering events where a smart battery pack is swapped by a local attacker during intrusion or tampering event, and man in the middle replays of older "all clear" notification messages.

Upon successful decryption, the BMU will retrieve the current state of the Batt_Disc flag and/or current increment of battery disconnect counter value from the battery system NVM and transmit the Batt_Disc flag state and/or battery disconnect counter value across the network to the querying remote information handling system, e.g., for notification and/or display to a remote user. In one embodiment, the correct current battery disconnect counter value will be transmitted to the remote information handling system even in the case that the current state of the Batt_Disc flag is incorrect, e.g., such as in the event that a Batt_Disc flag state indicating chassis intrusion or tampering was previously cleared by a local adversary.

In some embodiments, other additional or alternative actions may be automatically taken upon detection of an occurrence of a tampering and/or intrusion event into the chassis of the host information handling system. In one embodiment, a programmable integrated circuit of a battery-powered information handling system may be programmed with an auto-triggering capability that automatically initiates computer manufacturer or vendor diagnostics upon detection that the computer chassis has been at least partially opened during a chassis tampering or intrusion event. For example, manufacturer or vendor diagnostics may be automatically re-run by a host programmable integrated circuit of the system (e.g., by the system CPU) any time that it is detected that the chassis of the system has experienced a tampering or intrusion event since the last system boot, but not re-run by the host programmable integrated circuit at any given system boot if no such chassis tampering or intrusion event has been detected to occur since the last system boot.

In another embodiment, a full system boot routine (e.g., a boot routine that includes device re-detection and/or device enumeration query routines on a system bus, etc.) may only be required at the next system boot following detection that the chassis of the system has experienced a chassis tampering or intrusion event. Such a detected tampering or intrusion event may not be malign, but may instead correspond to a system service event, e.g., where a system user or technician opens the system chassis to install or replace memory modules or other hardware devices such as storage drives, graphics cards, etc. Otherwise, a fast system boot routine that includes a number of boot operations that is less than the number of boot operations of the full system boot routine (e.g., such as a boot routine that skips the device re-detection and/or the device enumeration routines, etc.) may be run at any given system boot if no such chassis tampering or intrusion event has been detected to occur since the last system boot. In such an embodiment, device detection and/or enumeration is not required where it is known that the chassis has not been opened since the last system boot, e.g., a full memory detection is not required when the chassis has not been opened since the last system boot to change the amount of system memory.

In one respect, disclosed herein is an information handling system, including: a chassis enclosure having chassis outer walls defining at least one cavity therebetween; at least one removable chassis lid; an opening defined in at least one of the chassis outer walls, the opening being complimentary-shaped and sized to receive the chassis lid in a mechanically engaged position to close off the opening; a switch disposed within the cavity between the chassis outer walls, the switch actuating to provide a system present signal to indicate the presence of the removable chassis lid received in an installed position in the opening and actuating to not provide the system present signal to indicate the absence of the removable chassis lid received in the installed position in the opening; and a battery system disposed within the cavity of the chassis enclosure. The battery system may include: one or more rechargeable battery cells providing electrical current to a system load of an information handling system, memory, and at least one programmable integrated circuit coupled to exchange data with the memory and the one or more battery cells, the programmable integrated circuit of the battery system receiving the system present signal from the switch. The programmable integrated circuit of the battery system may be programmed to: sense the system present signal provided from the switch, and store an indicator of the absence of the removable chassis lid received in the installed position in the opening in the memory of the battery system upon sensing that the system present signal is not provided.

In another respect, disclosed herein is a method, including operating a first programmable integrated circuit of a battery system disposed within a cavity defined between chassis outer walls of a chassis enclosure of a first information handling system to: sense a state of a system present signal provided by a switch disposed within the cavity of the chassis enclosure, the switch actuating to provide the system present signal to indicate the presence of a removable chassis lid received in an installed position in an opening defined in at least one of the chassis outer walls and actuating to not provide the system present signal to indicate the absence of the removable chassis lid received in the installed position in the opening; and store an indicator of the absence of the removable chassis lid received in the installed position in the opening in a memory of the battery system upon sensing that the system present signal is not provided. The battery system may include one or more rechargeable battery cells providing electrical current to a system load of the first information handling system, the first programmable integrated circuit of the battery system exchanging data with the memory and the one or more battery cells of the battery system.

DESCRIPTION OF ILLUSTRATIVE EMBODIMENTS

Figure 1:
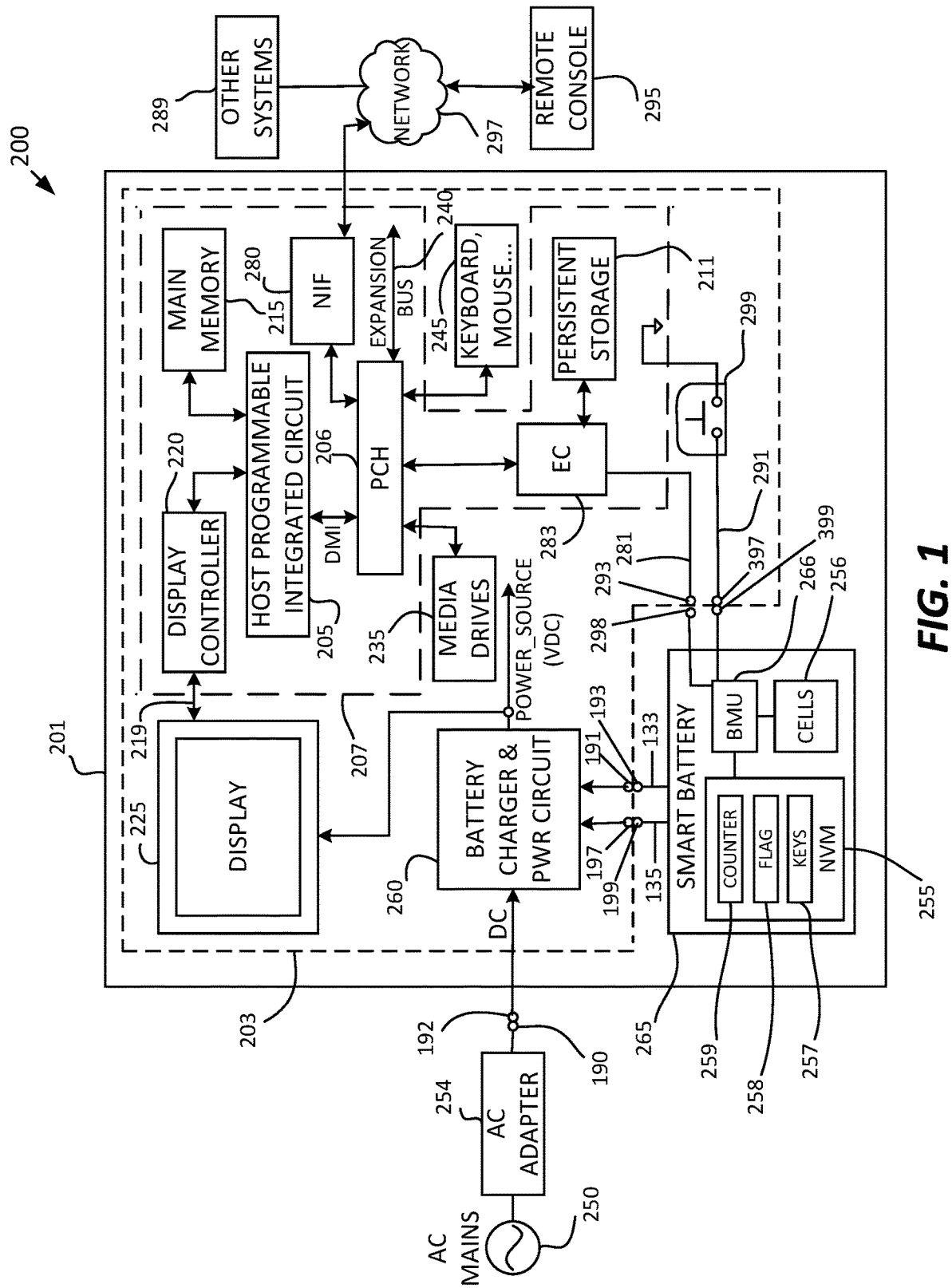
FIG. 1 illustrates a block diagram of an information handling system according to one exemplary embodiment of the disclosed systems and methods.

FIG. 1 is a block diagram of a battery-powered information handling system 200 (e.g., mobile portable information handling system such as notebook computer, MP3 player, personal data assistant (PDA), cell phone, smart phone, cordless phone, tablet computer, "2-in-1" or convertible computer, etc.) as it may be configured with various components within an outer chassis enclosure 201 (e.g., tablet computer body or smartphone body, hinged notebook computer base, etc.) according to one exemplary embodiment of the disclosed systems and methods. It will be understood that the embodiment of FIG. 1 is exemplary only, and that other in other embodiments an information handling system may include additional, fewer and/or alternative components suitable for a given application including other programmable integrated circuits such as discrete graphics processing units (GPUs), etc.

As shown in FIG. 1, information handling system 200 of this exemplary embodiment includes a host processing device or host programmable integrated circuit 205 (e.g., CPU such as an Intel Pentium series processor, an Advanced Micro Devices (AMD) processor or one of many other processors currently available) which may be optionally coupled together with a platform controller hub (PCH) 206 and other circuit components on the printed circuit board (PCB) of a motherboard 207. Other examples of programmable integrated circuits 205 include any other suitable one or more programmable integrated circuits such as controller, microcontroller, microprocessor, ASIC, programmable logic device "PLD" such as FPGA, complex programmable logic device "CPLD", etc.

In the illustrated embodiment, host programmable integrated circuit 205 may be configured to execute an operating system (OS) such as Windows-based operating system, Linux-based operating system, etc. System memory 215 (e.g., DRAM) and a display controller 220 may be coupled as shown to host programmable integrated circuit 205, and a display device 225 (e.g., video monitor) may be coupled to display controller 220 to provide visual images (e.g., via graphical user interface) to the user, e.g., via eDP components 219 such as eDP cable and eDP connector. Media drives 235 (e.g., hard disk drive, solid state drive, etc.) may be coupled as shown to host programmable integrated circuit 205 via PCH 206 to provide permanent or non-volatile storage for the information handling system.

Still referring to FIG. 1, an optional expansion bus 240 may be coupled to PCH 206 to provide the information handling system with additional plug-in functionality. Expansion bus 240 may be a PCI bus, PCI Express bus, SATA bus, USB or virtually any other expansion bus. Input/Output (I/O) devices 245 (e.g., such as a keyboard, touchpad, mouse) may be coupled via PCH 206 to host programmable integrated circuit 205 to enable the user to interact with the information handling system. In other mobile applications, such as convertible computer, tablet computers and smart phones, a touchscreen may additionally or alternatively be provided for both presenting a graphical user interface (GUI) and for accepting user input. An embedded controller (EC) 283 may also be coupled to PCH 206 as shown, and may be configured to perform various tasks such as participating in detection of chassis intrusion, battery and power management, I/O control, etc. Persistent storage 211 (e.g., embedded and partitioned flash memory, Electrically Erasable Programmable Read Only Memory—EEPROM, etc.) may be coupled to EC 283 for storing persistent information for EC 283.

Figure 11:
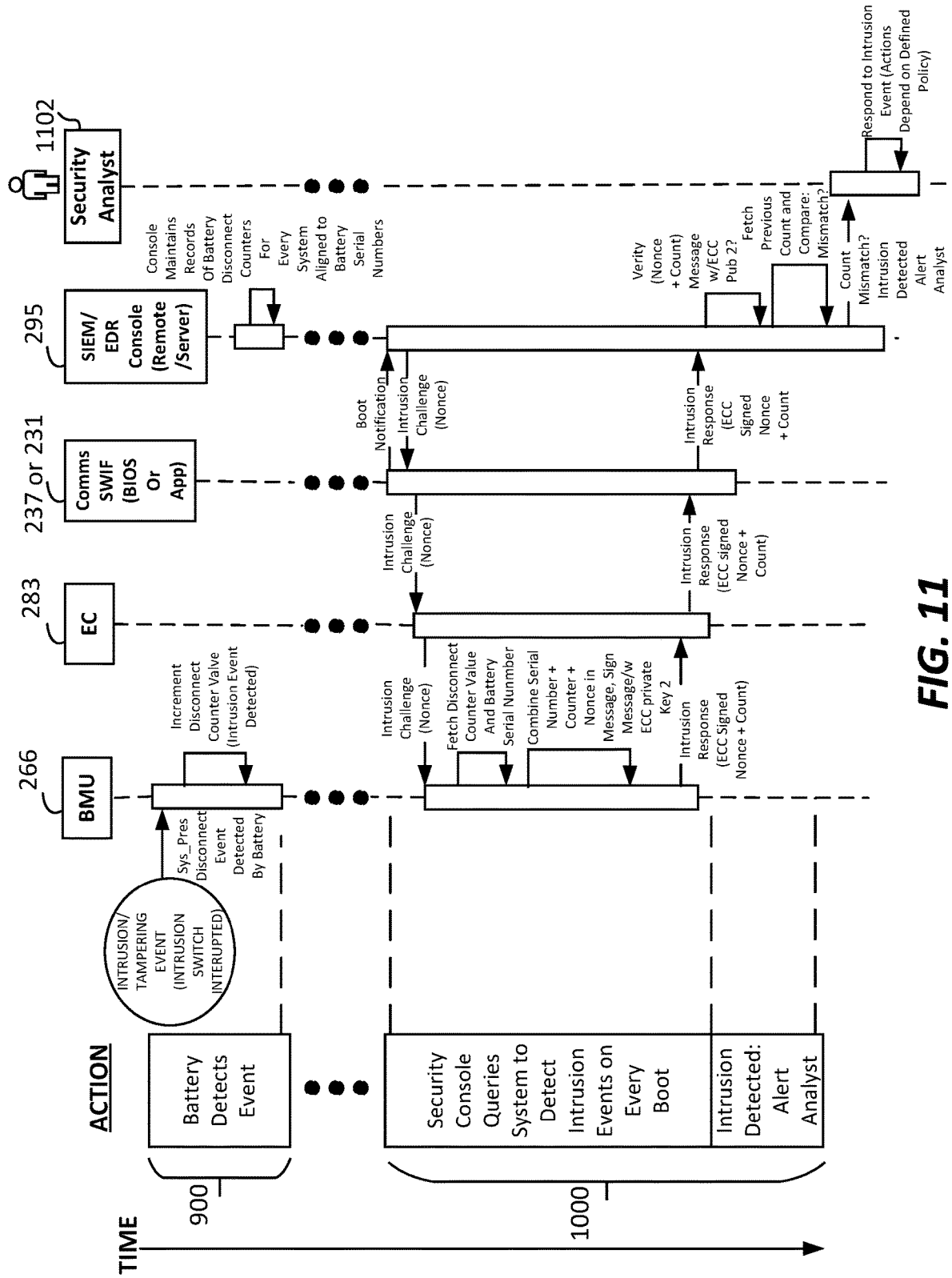
FIG. 11 illustrates methodology according to one exemplary embodiment of the disclosed systems and methods.

In FIG. 1, a network interface (NIF) device 280 may be coupled as shown to host programmable integrated circuit 205 via PCH 206 to enables wired and/or wireless communication across an external network 297 (e.g., the Internet or corporate intranet) with one or more remote network devices or systems that may in this embodiment include a remote console 295 that is operated by a remote human user who may be a network administrator, such as a security analyst 1102 shown in FIG. 11. As shown, remote console 295 may also be communicating across network 297 with one or more other systems 289 similar to local system 200. In one embodiment NIF 280 may include a network interface controller (NIC) communicating with network 297 across a local area network (LAN) or wireless LAN. In another embodiment, NIF 280 may include an optional radio module having at least one antenna element coupled to the radio module for wireless reception and transmission, e.g. to enable wireless LAN and/or cellular data communications, for example, as illustrated and described in U.S. Pat. No. 10,496,509, which is incorporated herein by reference in its entirety for all purposes.

In the particular embodiment of FIG. 1, information handling system 200 is coupled to an external source of power, namely AC mains 250 through AC adapter 254. It will be understood that external power may be alternatively provided from any other suitable external source (e.g., external DC power source) or that AC adapter 254 may alternatively be integrated within an information handling system 200 such that AC mains 250 supplies AC power directly to information handling system 200. As shown AC adapter 254 is removably coupled to, and separable from, battery charger/power circuit 260 of information handling system 200 at mating interconnection power terminals 191/193 and 197/199 in order to provide information handling system 200 with a source of DC power to supplement DC power provided by battery cells of a battery system in the form of a self-contained smart battery pack 265, e.g., lithium ion ("Li-ion") or nickel metal hydride ("NiMH") battery pack including one or more rechargeable battery cells 256 and a battery management unit (BMU) 266 that includes, for example, an analog front end ("AFE") coupled to a microcontroller or other programmable integrated circuit. BMU 266 may be coupled as shown to battery pack non-volatile memory (NVM) 255, although NVM 255 may alternatively be integrated as part of BMU 266 and coupled to the BMU programmable integrated circuit to perform the same tasks or functions described herein for NVM 255. Battery charger/power circuit 260 of information handling system 200 may also provide DC power for recharging battery cells of the battery system 265 during charging operations. Although a self-contained integrated smart battery pack 265 is illustrated in this embodiment, it will be understood that the described functionality of the smart battery pack 265 may alternatively be implemented in other embodiments using separate battery pack components as described elsewhere herein.

As further shown in FIG. 1, a battery system data bus (SMBus) 281 may be coupled to smart battery pack 265 by interconnection terminals 293 and 298 to exchange data (e.g., including real time and/or stored information from NVM 255 and BMU 266 of smart battery pack 265) with EC 283 and other components such as host programmable integrated circuit 205. Interconnection terminals 293 and 298 may include board-to-board data connectors or may be configured according to any other suitable electrical data interconnection format. Examples of such information include, but are not limited to, operating conditions (e.g., battery operating conditions including battery state information such as battery current amplitude and/or current direction, battery voltage, battery charge cycles, battery state of charge, battery state of health, battery temperature, battery usage data such as charging and discharging data, temperature profile, cycle count, etc.; and/or host system operating conditions such as processor operating speed data, system power management and cooling system settings, etc.).

As described further herein, information provided from smart battery pack 265 to EC 283 and/or other programmable integrated circuit/s of system 200 may also include battery disconnect information that is maintained on battery pack NVM 255 by BMU 266 based on status of system present (Sys_Pres) signal 291 on a pin of BMU 266. In this regard, change in "system present" signal 291 at BMU 266 indicates that status of this signal between battery pack 265 and motherboard and associated circuitry 207 within a main portion 203 of information handling system 200 has changed (e.g., interrupted) in a manner that indicates to BMU 266 that connection between battery pack 265 and motherboard and circuitry 207 has been interrupted. For example, BMU 266 may maintain at least one of a battery disconnect counter value 259 and/or battery disconnect (Batt_Disc) flag value 258 on NVM 255 based on activity (e.g., changes in status) of Sys_Pres signal 291 as it is transmitted between battery pack 265 and motherboard and circuitry 207 as shown in FIG. 1. NVM 255 may also store cryptographic keys 257 that may be used by BMU 266 for verification of a remote query may be made to the BMU across network 297, e.g., using public key infrastructure (PKI) encryption or other encryption scheme.

In the embodiment of FIG. 1, Sys_Pres signal 291 is provided through interconnected terminals 397 and 399 an inline battery disconnect switch 299 configured as an chassis intrusion switch, the location of which in FIG. 1 is only exemplary. Interconnection terminals 397 and 399 may include mating board-to-board conductive data connectors or may be configured according to any other suitable mating conductive data interconnection format. As shown herein in FIGS. 3A, 3B, 4A, 4B, 5A and 5B, battery disconnect switch 299 may be positioned at any suitable position relative within chassis enclosure 201 relative to a chassis lid 301 (or any other chassis enclosure access point) so as to be normally closed to conduct the Sys_Pres signal 291 from the motherboard and circuitry 207 to the BMU 266 as long as the chassis enclosure remains intact and unopened (or otherwise untampered with). In such an embodiment, battery disconnect switch 299 is further positioned to be actuated to open or otherwise disconnect the conductance of the Sys_Pres signal 291 to the BMU 266 upon opening of the chassis enclosure 201 or other mechanical tampering with the chassis enclosure 201 (e.g., that results in mechanical manipulation to open or otherwise turn "OFF" the chassis intrusion switch 299). For example, in one embodiment an inline chassis intrusion switch 299 may be positioned inside the system chassis enclosure 201 such that the act of opening a chassis lid 301 (e.g., d-cover or chassis cover) of the chassis or otherwise accessing the chassis interior turns "OFF" the switch 299 so as to interrupt conductance of the Sys_Pres signal 291 from the motherboard and circuitry 207 to the BMU 266.

In one embodiment, when a battery system 265 of a portable information handling system 200 is optionally provided as a replaceable smart battery pack, it may be configured for insertion (paring with main portion 203) and removal (un-pairing with main portion 203) from a corresponding battery pack compartment defined within the chassis 201 of the information handling system 200 (e.g., such as plastic and/or metal enclosure of a notebook computer, tablet computer, convertible computer smart phone, etc.), and may be provided with external power connector terminal/s 193 for contacting and making temporary electrical interconnection (e.g., via a non-soldered connection that relies on a mechanical interference fit) with mating power connector terminal/s 191 provided within the battery pack compartment to provide power 133 to the system load (i.e., power-consuming components) of a main portion 203 of the information handling system 200. Similarly, data terminal/s 298 of smart battery pack 265 may be provided to contact and temporarily interconnect in similar manner with data terminal/s 293 of system 200 to provide data communication between smart battery pack components (e.g., BMU 266) and SMBus 281 when battery pack 265 is inserted or otherwise paired with main portion 203. Optional Vcc rail terminal/s 199 of smart battery pack 265 may also be present as shown to contact and temporarily interconnect in similar manner with matching terminal/s 197 of system 200 to provide regulated voltage 135 to one or more components of main portion 203 of information handling system 200 battery pack 265 is inserted or otherwise paired with main portion 203. It will be understood that in an alternate embodiment, each connector 193, 199 and 298 of smart battery pack 265 may be soldered to the respective corresponding system terminal 191, 197 or 293, to form a permanent electrical interconnection.

Figure 2:
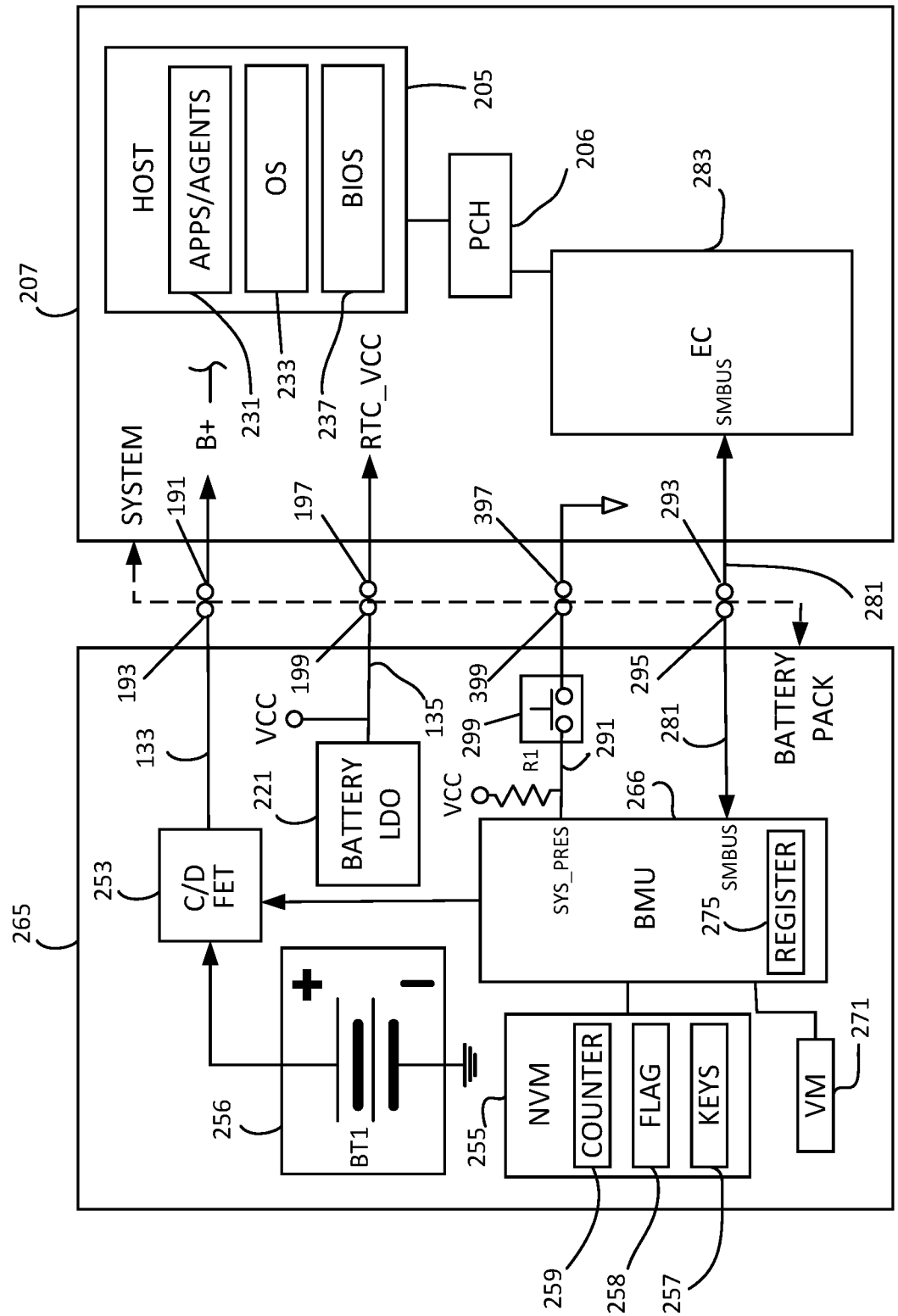
FIG. 2 illustrates interconnected electronic and logic components of a smart battery pack and motherboard and circuitry according to one exemplary embodiment of the disclosed systems and methods.

FIG. 2 illustrates some of the interconnected electronic and logic components of a self-contained integrated smart battery pack 265 and motherboard and circuitry 207 according to one exemplary embodiment. In this regard, FIG. 2 illustrates battery cell/s 256 that are coupled through charge/discharge field effect transistors (C/D FET) circuitry 253 to battery pack external power terminal 193 for interconnect to system terminal 191. Not shown are power conductors that provide power directly from battery cell/s 256 to each of BMU 266 and battery low-dropout (LDO) regulator 221, even when battery pack 265 is disconnected and/or removed from the remainder of system 200. In one embodiment BMU 266 may be powered by other components of system 200 when the system components 207 are present and the system 200 is coupled to an external power source (e.g., powered AC adapter 254). For example, BMU 266 may be powered by battery charger and power circuit 260 using external power provided by a powered AC adapter 254 at those times that system 200 is coupled to the powered AC adapter 254.

Also shown in FIG. 2 are BIOS 237, OS 233 and one or more applications or agents 231 executing on host programmable integrated circuit 205. Further information on configuration and operation of battery-powered information handling systems, smart battery packs, charge/discharge FETs, and BMUs may be found, for example, in U.S. Pat. Nos. 7,595,609, 7,436,149, 8,154,255, and 9,496,932, each of which is incorporated herein by reference in its entirety for all purposes.

As shown in FIG. 2, a battery low-dropout (LDO) regulator 221 may be present to provide regulated voltage 135 as a Vcc power rail (e.g., of 3.15 to 3.45 volts, although greater or lesser Vcc voltages are possible in other embodiments) to other circuitry of smart battery pack 265 and to terminal/s 199 (e.g., to source a system real time clock "RTC" Vcc power rail). In the embodiment of FIG. 2, Sys_Pres signal 291 is monitored by BMU 266 and is coupled to Vcc rail voltage through resistor $R_1$ (e.g., having resistance value of 100 K-ohms to 200 K-ohms, although greater or lesser $R_1$ resistance values are possible in other embodiments) on battery pack 265 as shown. In this configuration, the Vcc voltage on Sys_pres signal 291 is pulled down low (e.g., to system ground on motherboard 207) to low voltage (e.g., to 0 volts although signal low values greater than 0 are possible in other embodiments) for as long as battery disconnect switch 299 remains closed ("ON"), with resistor R₁ limiting flow of current from the Vcc rail in this condition. When disconnect switch 299 is opened ("OFF"), Vcc current through resistor R₁ raises the voltage of Sys_Pres signal 291 to high (e.g., to the voltage of Vcc) to indicate to BMU 266 that switch 299 has been opened (e.g., in the event that chassis enclosure 201 has been opened and/or tampered with), and BMU 266 may respond to this indication by setting battery disconnect (Bat_Disc) flag value 258 on battery NVM 255 and/or BMU register 275 to true, and/or by incrementing battery disconnect counter value 259 (or altering a pseudo-random ephemeral key, etc.) on battery NVM 255. It will be understood, however, that in other embodiments a Sys_Pres signal 291 may employ other signal values or voltages to indicate to BMU 266 when switch 299 has been opened or closed. Further information on exemplary possible electrical and mechanical configurations, as well as mounting locations, of disconnect switch/es 299 is described and illustrated in relation to FIGS. 3A to 5B herein.

Although a particular exemplary embodiment is illustrated, it will be understood that BMU 266 may employ locations within NVM 255 for storing state, and/or may also employ battery system registers 275 and/or optional volatile memory 271 (such as variable space) shown in FIG. 2 for retaining state. Counters 259, flags 258, and/or keys 257 may be kept in either volatile or non-volatile memory to implement one or more of the features described herein. For example, in the case of an ephemeral secret implementation, the ephemeral secret (or key) may be kept in volatile memory, such that resetting the BMU 266 also resets the secret, thus mitigating physical attacks on BMU NVM 255. It is also possible that either the volatile or non-volatile memory coupled to BMU 266 may be erased (or counters incremented) by the BMU 266 in the same way to accomplish the goal of changing the state of BMU 266 when a tamper/chassis event is detected.

In one embodiment of the disclosed systems and methods, a battery disconnect switch 299 may be any suitable type of ON-OFF switch that is coupled inline (in series) with a conductor of Sys_Pres signal 291 between battery pack 265 and motherboard and circuitry 207, and that is positioned to be mechanically actuated upon occurrence of a chassis intrusion event, such as opening of a chassis lid 301 to access the chassis interior 310 of chassis enclosure 201. Suitable types of ON-OFF switches include, but are not limited to, biased switches such as a spring loaded push-to-make biased switch (i.e., momentary push-button switch).

Figure 3A:
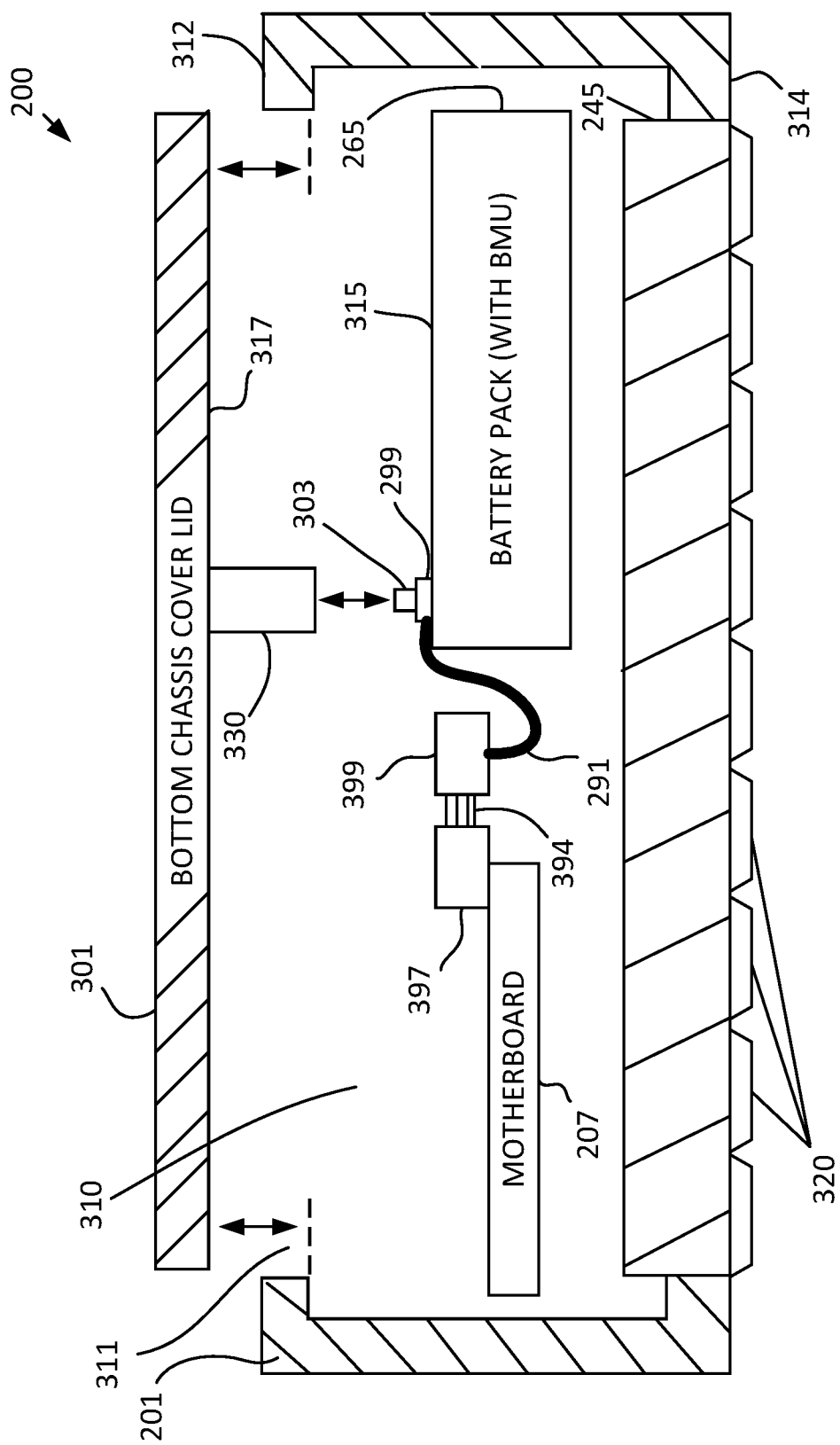
FIG. 3A illustrates a partial side cross-sectional view of a battery-powered information handling system according to one exemplary embodiment of the disclosed systems and methods.
Figure 3B:
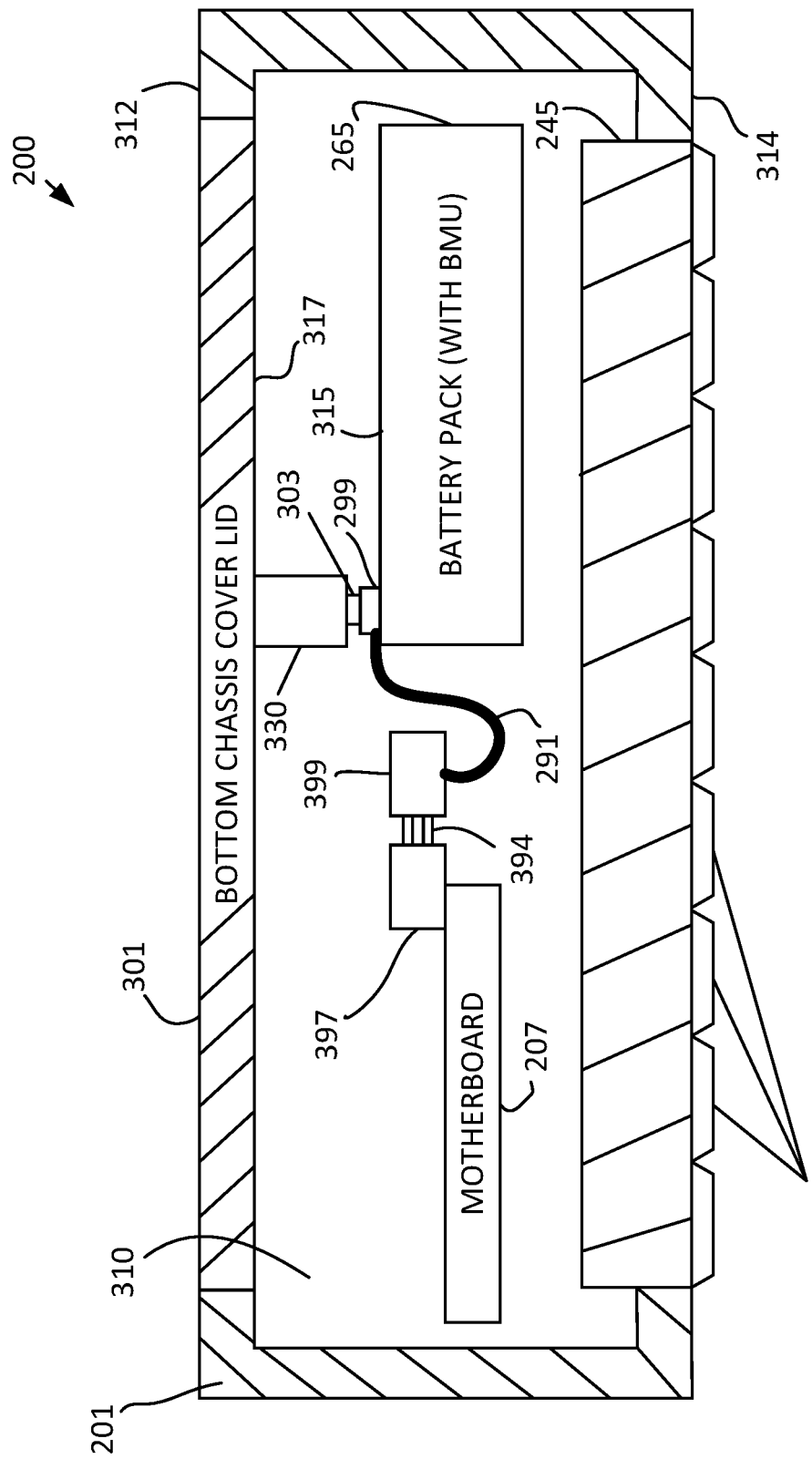
FIG. 3B illustrates a partial side cross-sectional view of a battery-powered information handling system according to one exemplary embodiment of the disclosed systems and methods.
Figure 3C:
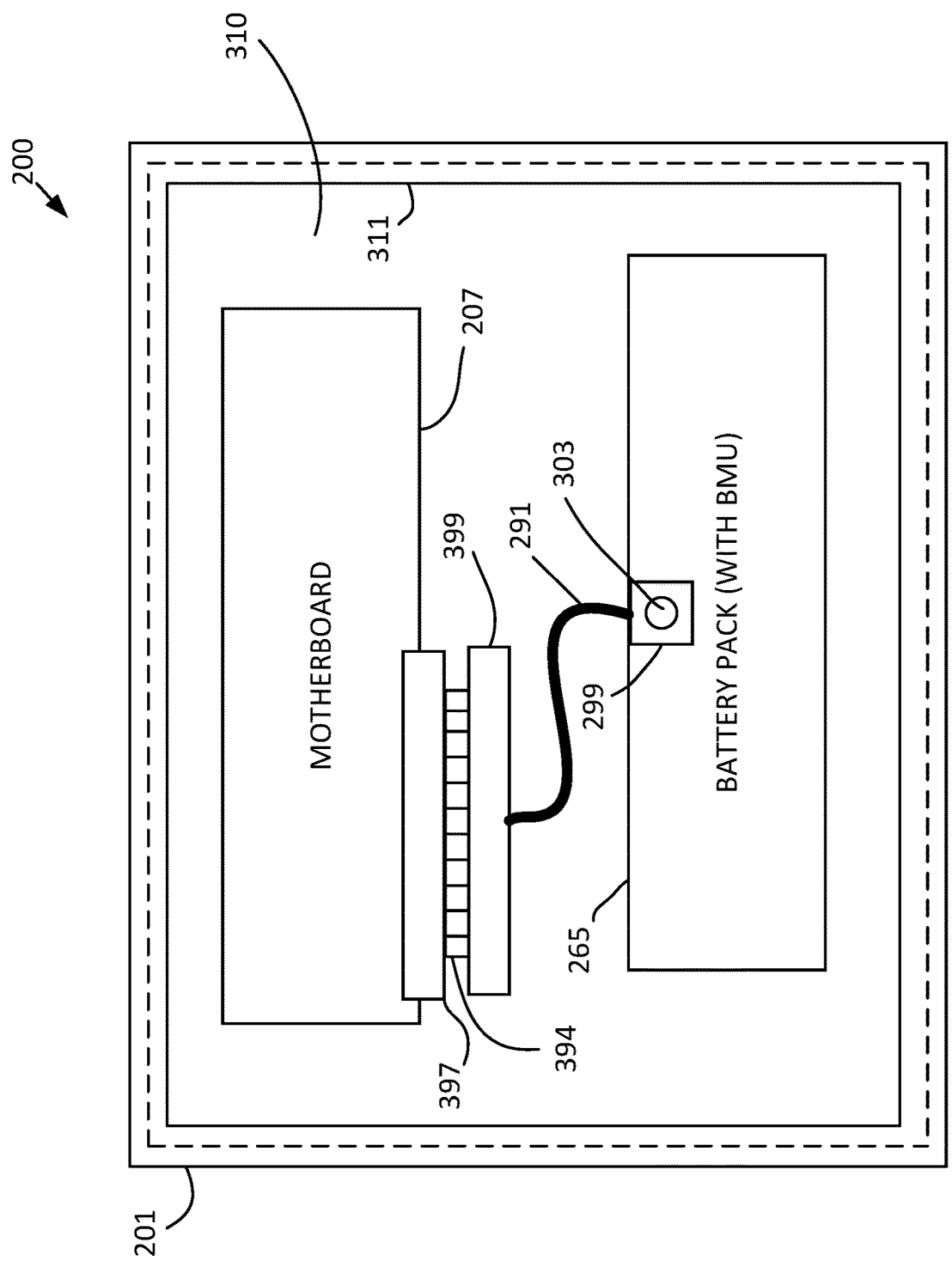
FIG. 3C illustrates a bottom (underside) view a battery-powered information handling system according to one exemplary embodiment of the disclosed systems and methods.

FIG. 3A illustrates a partial side cross-sectional view of one exemplary embodiment of a battery-powered information handling system 200 (such as a notebook computer) that is in inverted position with the bottom side of system 200 oriented upward. In FIG. 3A, a removable chassis lid 301 is shown separated from chassis enclosure 201 of system 200 to expose a chassis opening 311 defined in the chassis bottom outer wall 312, although it is alternatively possible that a chassis opening may be defined in another chassis outer wall (e.g., top or side chassis outer wall) of chassis enclosure. Chassis lid 301 is complimentary-shaped and sized to be received in installed position within the chassis opening 311 in a mechanically engaged position that closes off (or seals) opening 311 as shown in FIG. 3B. In FIG. 3A, chassis lid 301 is shown in a position aligned to be received in engagement with chassis opening 311. In FIG. 3B, chassis lid 301 is shown aligned and received in mechanical engagement with chassis opening 311. Also shown in FIGS. 3A and 3B is an I/O device 245 of system 200 that is present in this embodiment in the form of a keyboard assembly (e.g., QWERTY keyboard) with keyboard keys 320 provided on the top side 314 of system 200, e.g., on or within a top chassis outer wall of the chassis enclosure 201 (which is illustrated as positioned downward in FIG. 3A). FIG. 3C shows a bottom (underside) view of the battery-powered information handling system 200 of FIGS. 3A and 3B with chassis lid 301 removed.

In FIGS. 3A-3C, motherboard 207 and battery pack 265 are each positioned and mechanically fixed in position (e.g., with metal or plastic fasteners attached or otherwise mechanically coupled to an interior surface of the chassis enclosure outer wall/s or other fixed structures within cavity 310 of chassis enclosure 201) within a cavity 310 defined within an interior of chassis enclosure 201 between outer walls of the chassis enclosure 201, and battery disconnect switch 299 is mechanically mounted (e.g., by adhesive and/or fasteners) in fixed position to a surface 315 of battery pack 265 that faces outward (and is aligned with) an extending member in the form of a boss or post 330 that inwardly protrudes from the inner surface 317 of chassis lid 301. Battery disconnect switch 299 is electrically coupled to motherboard and circuitry 207 to selectively conduct Sys_Pres signal 291 between circuitry of motherboard 207 and BMU 266 of battery pack 265 via interconnected conductive data or signal pins 394 of terminals 397 and 399. In this embodiment, terminal 397 may be an existing commercial off-the-shelf (COTS) surface mount technology (SMT) board connector that is mechanically mounted on the PCB of motherboard 207 as shown, and terminal 399 and electrical conductor 291 may be an existing COTS battery cable and connector assembly.

In the illustrated embodiment of FIGS. 3A-3C, battery disconnect switch 299 is a spring-loaded push-to-make biased push button switch that remains open (i.e., to disconnect conduction of the Sys_Pres signal 291) until its button 303 is depressed by extending member 330 when chassis lid 301 is brought together with the remainder of chassis 201 as shown in FIG. 3B. As shown in FIG. 3B, chassis lid 301 is assembled and secured to chassis enclosure 201 (e.g., by fasteners such as screws) in a position to cover and close the chassis opening 311, while at the same time member 330 mechanically engages and depresses the button 303 of battery disconnect switch 299 to close the switch and conduct the Sys_Pres signal 291 from motherboard 207 to BMU 266 of battery pack 265. Upon removal of lid 301 from chassis 201 (or upon any other tampering event that partially moves chassis lid 301 apart from chassis 201), extending member 330 also moves away from chassis 201 which in turn allows spring-loaded button 303 to extend outwardly to a position as shown in FIG. 3A. When button 303 extends outwardly in this manner, battery disconnect switch 299 opens to disconnect conduction of the Sys_Pres signal 291 between motherboard 207 and BMU 266 of battery pack 265.

Although an extending member 330 may be provided to align with, engage and depress button 303 in the manner described above, it will be understood that in other embodiments a battery disconnect switch 299 may alternatively be positioned to be close enough to the inner surface 317 of chassis lid 301 when lid 301 is assembled to chassis 201 so that the inner surface 317 of chassis lid 301 itself mechanically engages and depresses the button 303 of battery disconnect switch 299 to close the switch and conduct the Sys_Pres signal 291 from motherboard 207 to BMU 266 of battery pack 265.

Figure 4A:
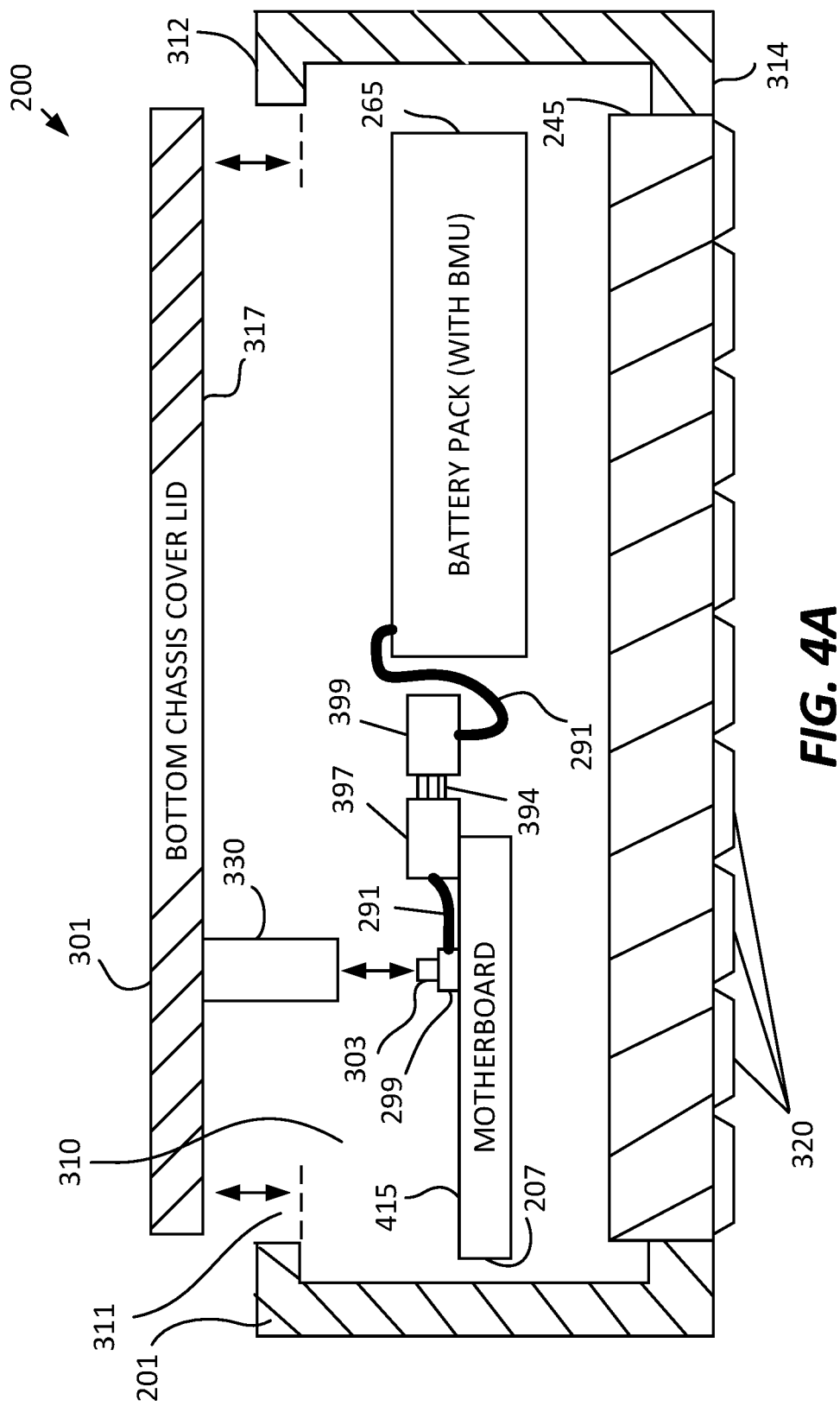
FIG. 4A illustrates a partial side cross-sectional view of a battery-powered information handling system according to one exemplary embodiment of the disclosed systems and methods.
Figure 4B:
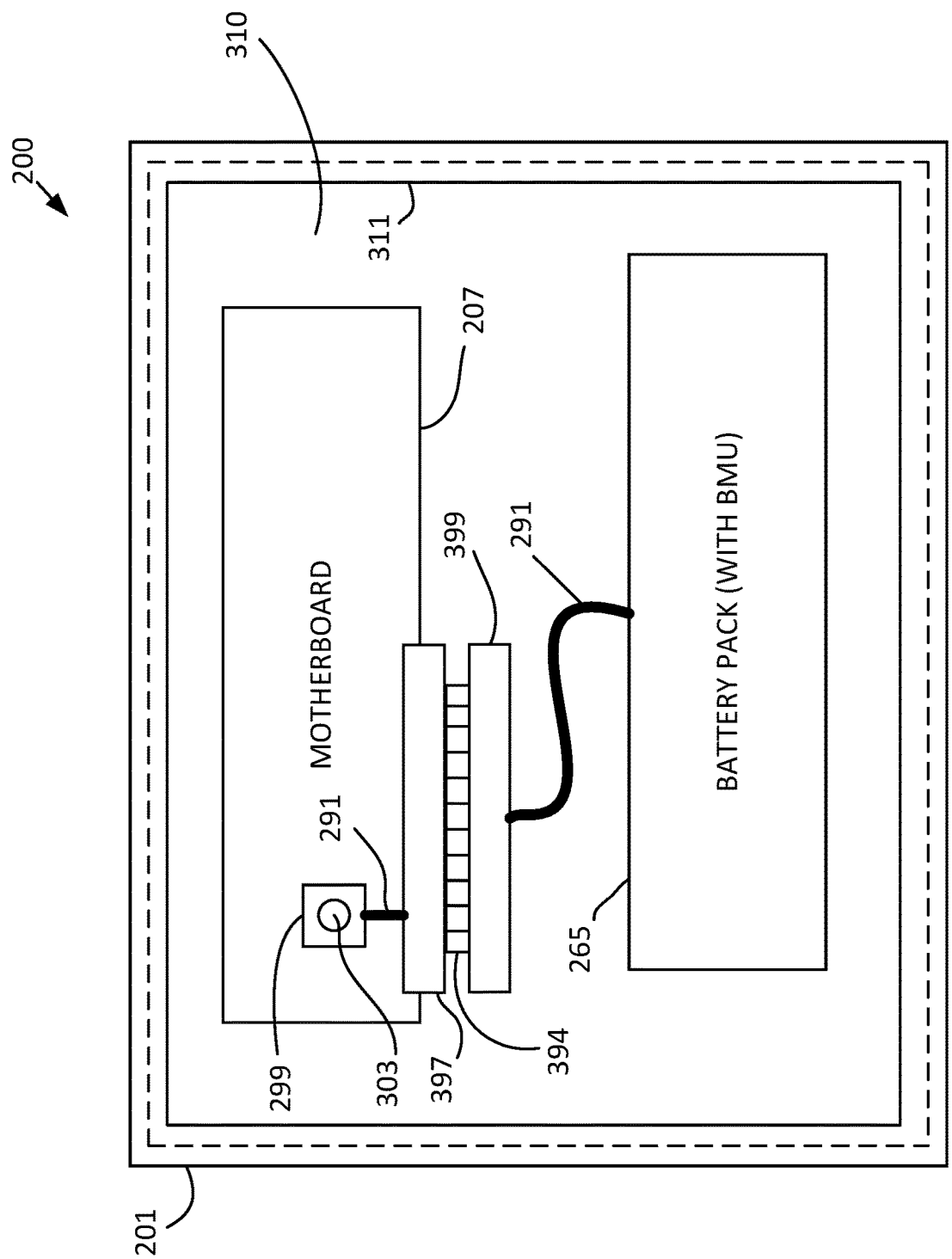
FIG. 4B illustrates a bottom (underside) view a battery-powered information handling system according to one exemplary embodiment of the disclosed systems and methods.

FIG. 4A illustrates a partial side cross-sectional view of another exemplary embodiment of a battery-powered information handling system 200 similar to that shown in FIGS. 3A-3C. In FIG. 4A, a removable chassis lid 301 is shown separated from chassis enclosure 201 of system 200 to expose an opening 311 defined in the chassis bottom side 312, and chassis lid 301 is shown in a position aligned to be received in engagement with chassis opening 311. FIG. 4B shows a bottom (underside) view of the battery-powered information handling system 200 of FIG. 4A with chassis lid 301 removed.

In FIGS. 4A and 4B, motherboard 207 and battery pack 265 are positioned within a cavity 310 defined within an interior of chassis enclosure 201, and battery disconnect switch 299 is mechanically mounted (e.g., by solder, fasteners and/or adhesive) to a surface 415 of motherboard 207 that faces outward (and is aligned with) an extending member in the form of a boss or post 330 that inwardly protrudes from the inner surface 317 of chassis lid 301. Battery disconnect switch 299 is electrically coupled to circuitry of motherboard 207 to selectively conduct Sys_Pres signal 291 between circuitry of motherboard 207 and BMU 266 of battery pack 265 via interconnected terminals 397 and 399. In this embodiment, terminal 397 may be an existing COTS surface mount technology (SMT) board connector that is mechanically mounted on the PCB of motherboard 207 as shown, and terminal 399 and electrical conductor 391 may be an existing COTS battery cable and connector assembly. FIG. 4B shows a bottom (underside) view of the battery-powered information handling system 200 of FIG. 4A with chassis lid 301 removed.

In the illustrated embodiment of FIGS. 4A-4B, battery disconnect switch 299 is a spring-loaded push-to-make biased push button switch that remains open (i.e., to disconnect conduction of the Sys_Pres signal 291) until its button 303 is depressed by extending member 330 when chassis lid 301 is brought together with the remainder of chassis 201, in similar manner as illustrated and described in relation to the embodiment of FIG. 4B. As with the embodiment of FIG. 3B, when chassis lid 301 is secured to chassis 201 to cover and close the chassis opening 311, extending member 330 depresses the button 303 of battery disconnect switch 299 to close the switch and conduct the Sys_Pres signal 291 from motherboard 207 to BMU 266 of battery pack 265. Upon removal of lid 301 from chassis 201 (or any other tampering event that partially moves chassis lid 301 apart from chassis 201), extending member 330 also moves away from chassis 201 which in turn allows spring-loaded button 303 to extend outwardly to a position as shown in FIG. 4A. When button 303 extends outwardly in this manner, battery disconnect switch 299 opens to disconnect conduction of the Sys_Pres signal 291 between motherboard 207 and BMU 266 of battery pack 265.

Figure 5A:
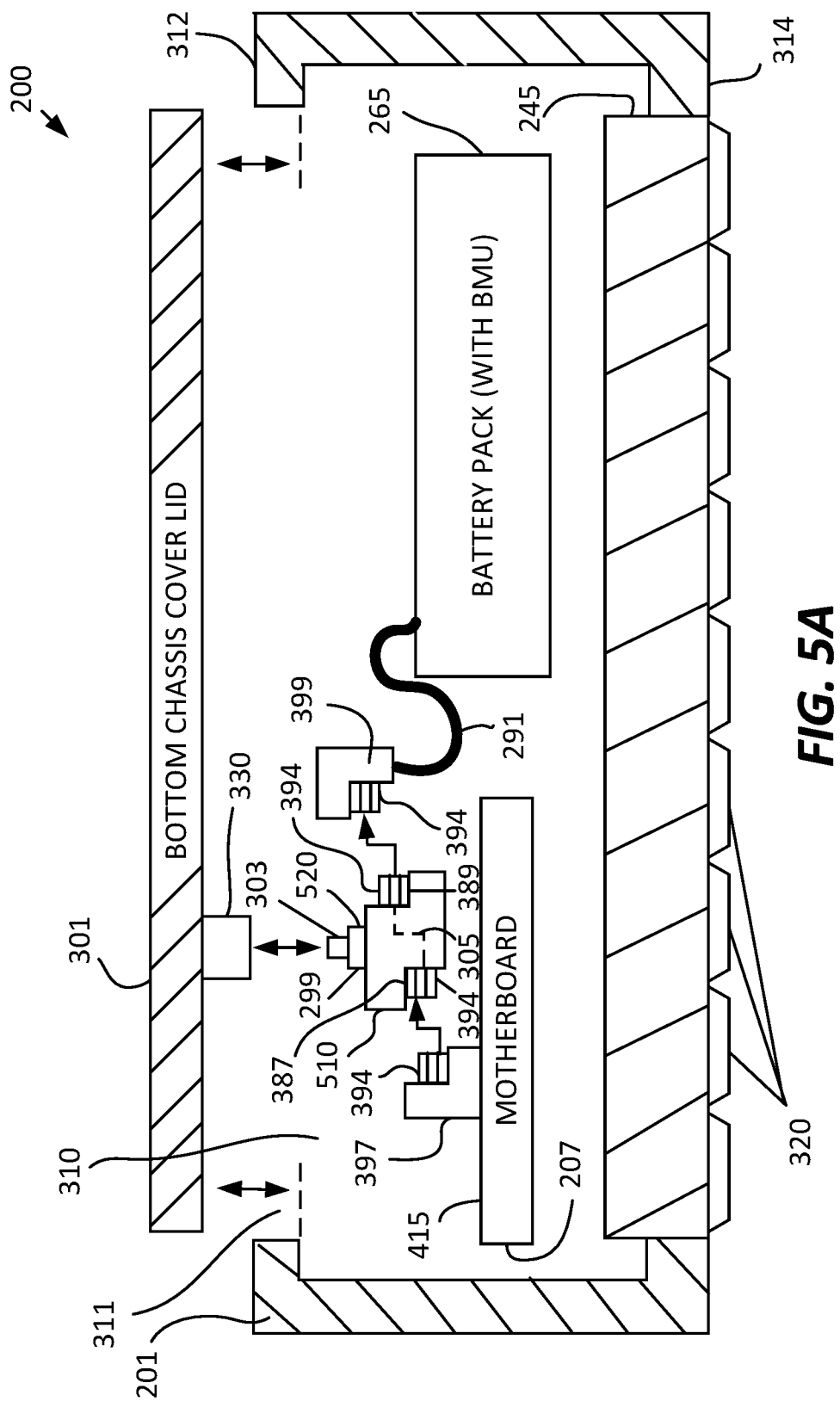
FIG. 5A illustrates a partial side cross-sectional view of a battery-powered information handling system according to one exemplary embodiment of the disclosed systems and methods.
Figure 5B:
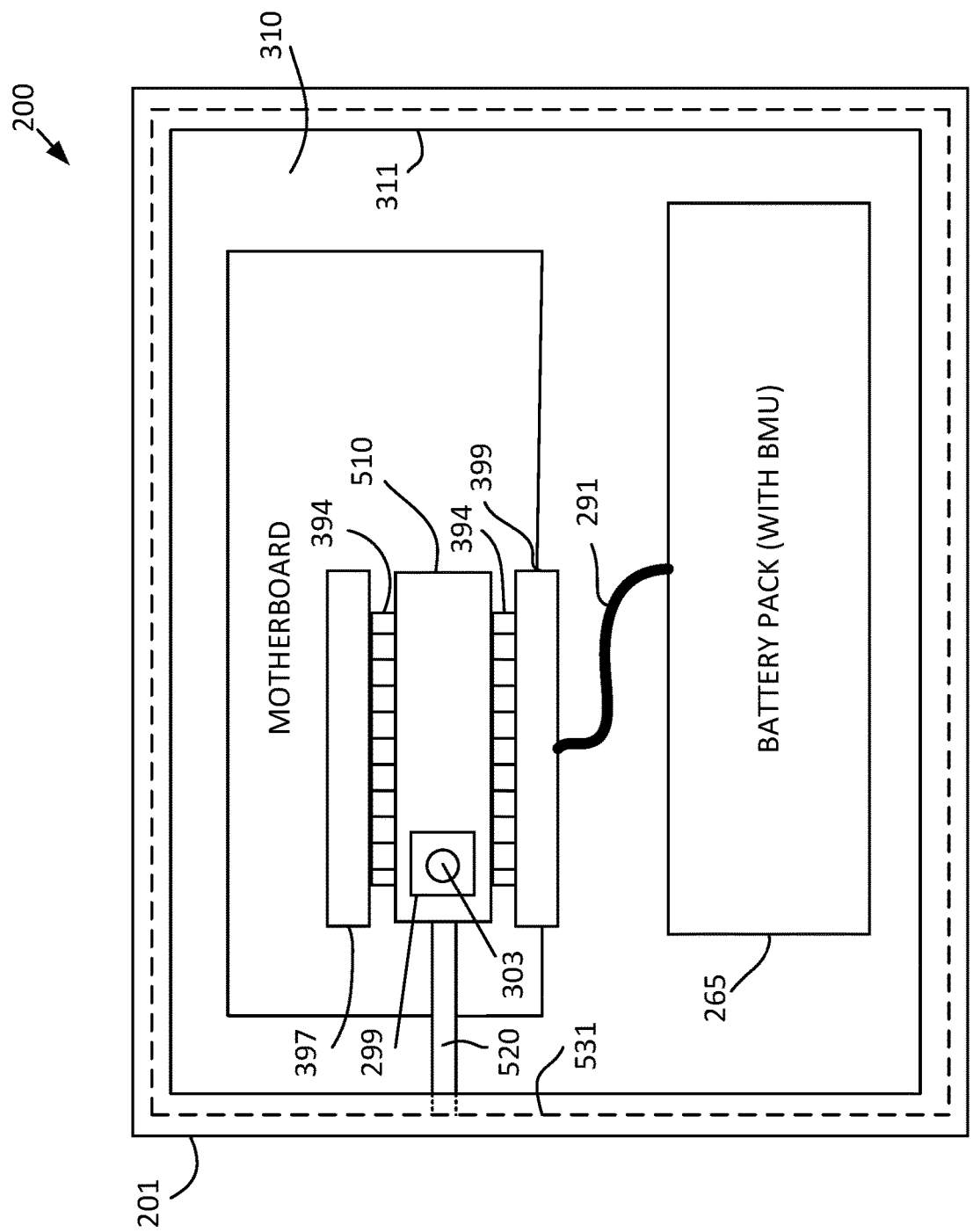
FIG. 5B illustrates a bottom (underside) view a battery-powered information handling system according to one exemplary embodiment of the disclosed systems and methods.

FIG. 5A illustrates a partial side cross-sectional view of another exemplary embodiment of a battery-powered information handling system 200 similar to that shown in FIGS. 3A-3C and 4A-4B. In FIG. 5A, a removable chassis lid 301 is shown separated from chassis enclosure 201 of system 200 to expose an opening 311 defined in the chassis bottom side 312, and chassis lid 301 is shown in a position aligned to be received in engagement with chassis opening 311. FIG. 5B shows a bottom (underside) view of the battery-powered information handling system 200 of FIG. 5A with chassis lid 301 removed.

In FIGS. 5A and 5B, motherboard 207 and battery pack 265 are positioned within a cavity 310 defined within an interior of chassis enclosure 201, and battery disconnect switch 299 is integrated (e.g., molded onto, attached to, etc.) a separate or discrete shim component 510 that includes first and second interconnection terminals 387 and 389 with electrically conductive data or signal pins 394 that are configured for conductive coupling to electrically conductive data or signal pins 394 respective terminals 397 and 399 as shown between motherboard 207 and battery pack 265. In this regard, a shim component 510 may be a modular (e.g., molded) plastic component that includes a switch 299 molded onto or otherwise attached or mechanically coupled to shim component 510. Shim component 510 may be provided as shown with integrated electrically conductive data or signal pins 394 that are configured to mate with electrically conductive data or signal connectors of terminals 397 and 399 to conductively couple switch 299 inline and in series with Sys_Pres signal 291 so that battery disconnect switch 299 is electrically coupled to circuitry of motherboard 207 to selectively conduct Sys_Pres signal 291 between circuitry of motherboard 207 and BMU 266 of battery pack 265. Shim component 510 may be mechanically fixed in position within chassis enclosure 201.

Besides the illustrated locations, it will be understood that it is alternatively possible that a shim component 510 and/or switch 299 may be otherwise located and mechanically fixed within cavity 310 of chassis enclosure 201, and/or that a switch 299 may be otherwise positioned separately from a shim component 510, motherboard 207 and battery pack 265, as long as switch 299 is positioned to be mechanically actuated by a chassis intrusion or tampering event which dislodges or otherwise moves or removes chassis lid 301, e.g., in the manner described elsewhere herein.

Terminals 397 and 399 of FIGS. 5A and 5B may be board-to-board electrically conductive data or signal pins 394, or may be another type of connectors configured according to any other data or signal interconnection format suitable for mating with pins 394 of terminals 397 and 399. In one embodiment, terminal 397 may be an existing COTS surface mount technology (SMT) board connector that is mechanically mounted on the PCB of motherboard 207 as shown, and terminal 399 and electrical conductor 291 may be an existing COTS battery cable and connector assembly. FIG. 5A shows an exploded view of shim component 510 as it may be positioned for mechanically coupling to terminals 397 and 399 as shown by the arrows. In FIG. 5B, shim component 510 is shown mechanically coupled to each of terminals 397 and 399 with pins 394 of each interconnected as shown.

As shown in FIG. 5B, shim component 510 may in one embodiment be mechanically supported and held in fixed position within chassis interior 310 at a desired position relative to chassis lid 301 by one or more plastic or metal mounting structures 520, e.g., which may be in turn mechanically coupled and fixed to one or more interior wall surfaces 531 of chassis enclosure. In this position, the push button 303 of switch 299 may be fixed in a position that faces outward (and is aligned with) an extending member in the form of a boss or post 330 that inwardly protrudes from the inner surface 317 of chassis lid 301. In other possible embodiments, a shim component 510 may be mounted onto (or built into) a motherboard 207, or may be otherwise held in position in any other way suitable for aligning push button 303 of switch 299 with extending member 330.

In the illustrated embodiment of FIGS. 5A-5B, battery disconnect switch 299 is a spring-loaded push-to-make biased push button switch that remains open (i.e., to disconnect conduction of the Sys_Pres signal 291) until its button 303 is depressed by extending member 330 when chassis lid 301 is brought together with the remainder of chassis 201, in similar manner as illustrated and described in relation to the embodiments of FIGS. 3B and 4B. As with the embodiments of FIGS. 3B and 4B, when chassis lid 301 is secured to chassis 201 to cover and close the chassis opening 311, extending member 330 depresses the button 303 of battery disconnect switch 299 to close the switch and conduct the Sys_Pres signal 291 from motherboard 207 to BMU 266 of battery pack 265. Upon removal of lid 301 from chassis 201 (or any other tampering event that partially moves chassis lid 301 apart from chassis 201), extending member 330 also moves away from chassis 201 which in turn allows spring-loaded button 303 to extend outwardly to a position as shown in FIG. 5A. When button 303 extends outwardly in this manner, battery disconnect switch 299 opens to disconnect conduction of the Sys_Pres signal 291 between motherboard 207 and BMU 266 of battery pack 265.

Figure 6:
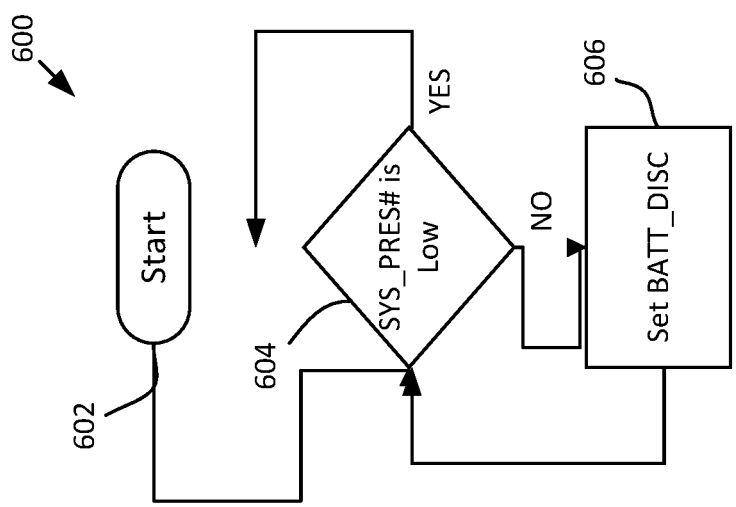
FIG. 6 illustrates methodology according to one exemplary embodiment of the disclosed systems and methods.
Figure 8:
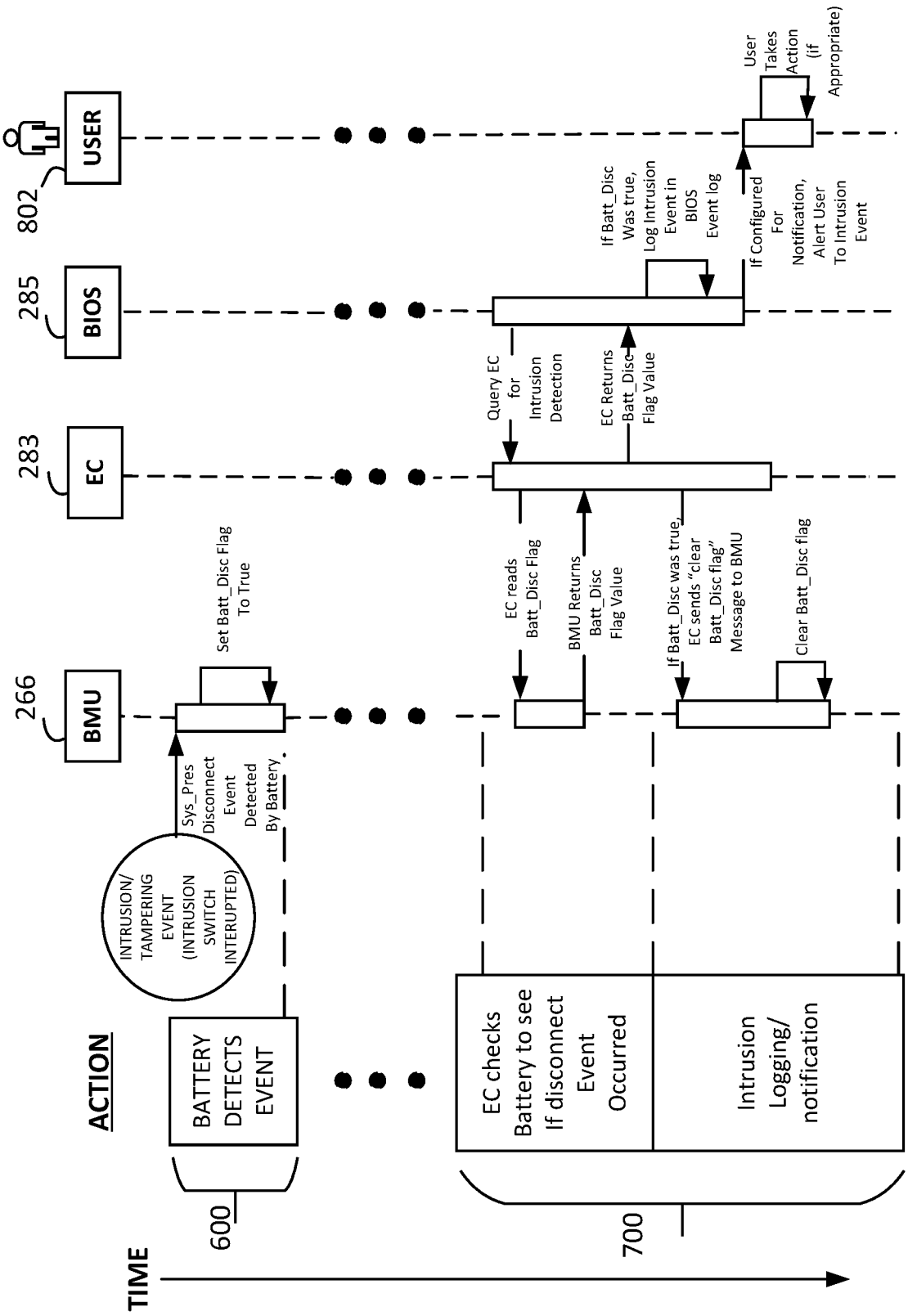
FIG. 8 illustrates methodology according to one exemplary embodiment of the disclosed systems and methods.

FIGS. 6 and 8 illustrate one exemplary embodiment of a methodology 600 that may be implemented (e.g., by BMU 266) to continuously monitor the status of the Sys_Pres pin signal 291. In this embodiment, methodology 600 may be performed under normal system operating conditions with the chassis lid 301 assembled and secured to chassis enclosure 201 in a position to cover and close the chassis opening 311, and with member 330 mechanically engaged and depressing the button 303 of battery disconnect switch 299 to close the switch and conduct the Sys_Pres signal 291 from motherboard 207 to BMU 266 of battery pack 265. The steps of methodology 600 may be continuously performed by BMU 266 for as long as sufficient charge remains in battery cell/s 256 to power BMU 266, e.g., even when most or all of the circuitry of motherboard 207 is unpowered (including host programmable integrated circuit 205) and/or when no external power is provided to system 200 at power terminal 192. Example system states during which BMU 266 may continue to implement methodology 600 include working, sleeping, soft OFF and mechanical OFF states, e.g., Advanced Configuration and Power Interface (ACPI) states S0, S1, S2, S3, S4 and S5, as well as a system mechanical OFF state (ACPI G3 state). FIG. 8 illustrates action/s of methodology 600 as they may be performed by individual components of system 200 or remote console 295 versus time.

Methodology 600 begins as shown in step 602 either when power is first provided to BMU 266 from battery cell/s 256, or thereafter whenever the Batt_Disc flag value 258 has been cleared or set to "Not True". BMU 266 then determines the status of Sys_Pres signal 291 in step 604. If Sys_Pres signal 291 is determined to be low in step 604, then this means that battery disconnect switch 299 remains closed to conduct the Sys_Pres signal 291 between motherboard 207 and BMU 266, and methodology 600 repeats as shown. However, if Sys_Pres signal 291 is determined in step 604 to have transitioned to high, then this means that battery disconnect switch 299 has opened (e.g., in response to loosening and/or separation of chassis lid chassis lid 301 from opening 311 of chassis enclosure 201) during a chassis intrusion or tampering event. In this event, battery disconnect switch no longer conducts the Sys_Pres signal 291 between motherboard 207 and BMU 266, and methodology 600 proceeds to step 606 where BMU 266 sets the Batt_Disc flag value 258 to be "True" in BMU register 275 and NVM 255.

Figure 7:
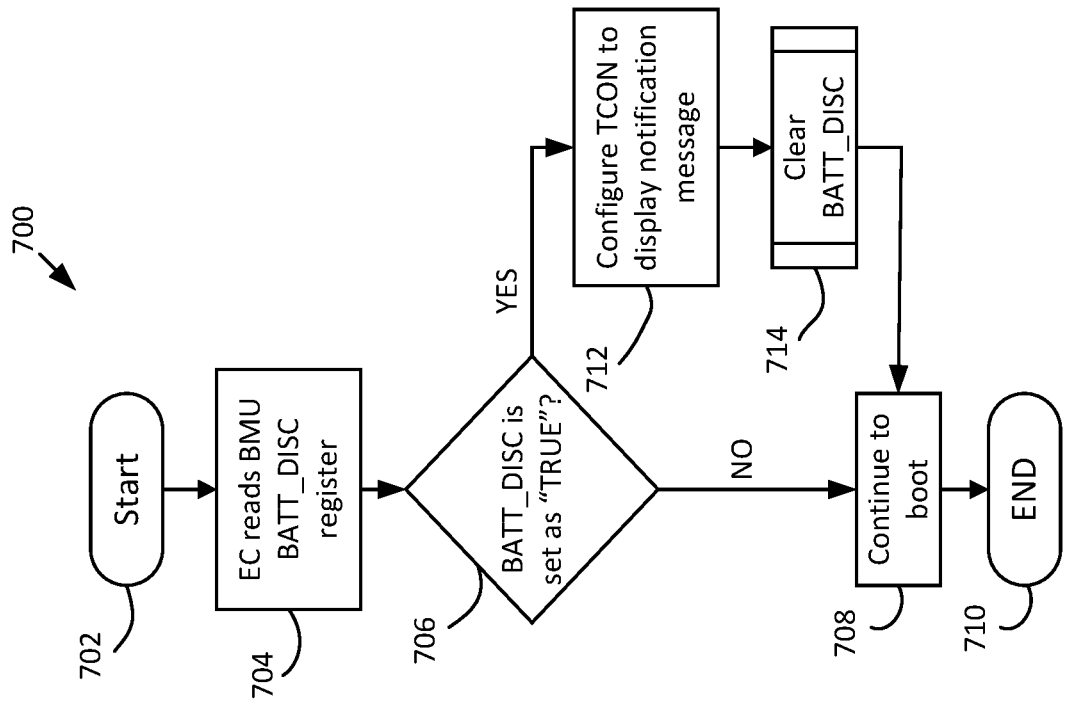
FIG. 7 illustrates methodology according to one exemplary embodiment of the disclosed systems and methods.

FIGS. 7 and 8 illustrate one exemplary embodiment of a methodology 700 that may be implemented by programmable integrated circuit/s of system 200 to alert a human user 802 of FIG. 8 when a chassis intrusion or tampering event has occurred and been previously logged in step 606 of methodology 600 of FIG. 6. It will be understood that methodology 700 may be performed in combination with methodology 1200 of FIG. 12 described further herein (e.g., sharing the common steps between the two methodologies), or may be performed alone without methodology 1200.

Methodology 700 begins in step 702 (e.g., upon power up or reboot of system 200), for example, after other steps of a normal boot sequence. Methodology 700 then proceeds to step 704 where BIOS 237 queries EC 283 to cause EC 283 to read the register 275 of BMU 266 to retrieve the value of the Batt_Disc flag value 258 ("Not True" or "True") from register 275. If the Batt_Disc flag value 258 has not been set to "True", then BMU 266 and EC 283 return a Batt_Disc flag value 258 value of "Not True" to BIOS 237 in step 706, and methodology 700 proceeds to step 708 where system 200 continues as normal with booting to the operating system (OS) executing on host programmable integrated circuit 205, before ending in step 710 with execution of OS runtime environment. However, if BMU 266 and EC 283 return a Batt_Disc flag value 258 value of "True" in step 706 to BIOS 237, then BIOS 237 logs the intrusion/tampering event in the BIOS log and optionally communicates in step 712 with display controller 220 (e.g., display timing controller "TCON") to cause display controller 220 to display a notification message (e.g., such as "Chassis Intrusion Detected" or other suitable warning message) on system display 225. In other embodiments of step 712, BIOS 237 may communicate with other system circuitry to cause output on a local system speaker of an audio notification message, such as an alarm sound or a synthesized spoken phrase like "Chassis Intrusion Detected" using synthesized voice.

In step 714, EC 283 also communicates with BMU 266 to cause BMU 266 to clear the Batt_Disc flag value 258 (set Batt_Disc flag value 258 to "Not True") so that it is ready to detect any different future intrusion/tampering event, and methodology proceeds to step 708 and continues as previously described. FIG. 8 illustrates action/s of methodology 700 as they may be performed by individual components of system 200 or remote console 295 versus time.

Figure 9:
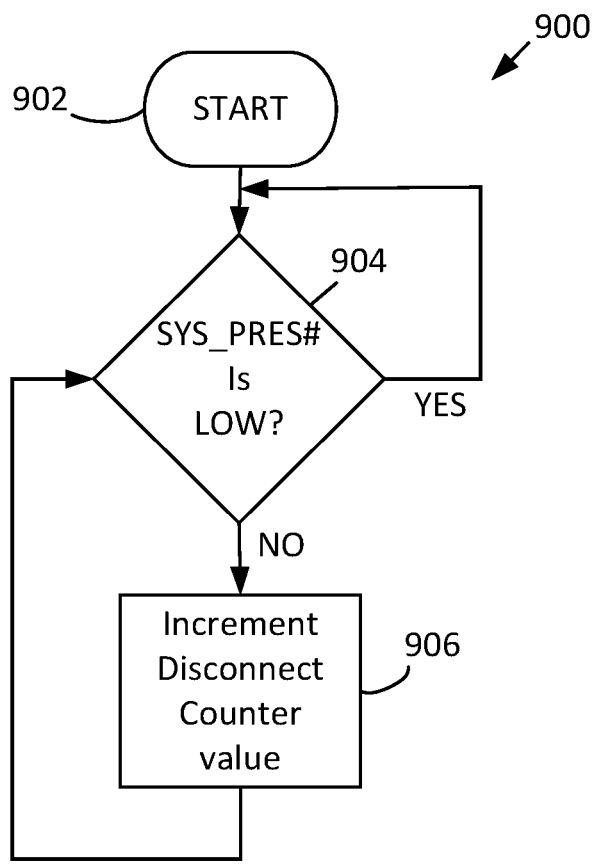
FIG. 9 illustrates methodology according to one exemplary embodiment of the disclosed systems and methods.

FIGS. 9 and 11 illustrate one exemplary embodiment of a methodology 900 that may be implemented (e.g., by BMU 266) to continuously monitor the status of the Sys_Pres pin signal 291. In this embodiment, methodology 900 may be performed under normal system operating conditions with the chassis lid 301 assembled and secured to chassis enclosure 201 in a position to cover and close the chassis opening 311, and with member 330 mechanically engaged and depressing the button 303 of battery disconnect switch 299 to close the switch and conduct the Sys_Pres signal 291 from motherboard 207 to BMU 266 of battery pack 265. The steps of methodology 900 may be continuously performed by BMU 266 for as long as sufficient charge remains in battery cell/s 256 to power BMU 266, e.g., even when most or all of the circuitry of motherboard 207 is unpowered (including host programmable integrated circuit 205) and/or when no external power is provided to system 200 at power terminal 192. Example system states during which BMU 266 may continue to implement methodology 900 include working, sleeping, soft OFF and mechanical OFF states, e.g., Advanced Configuration and Power Interface (ACPI) states S0, S1, S2, S3, S4 and S5, as well as a system mechanical OFF state (ACPI G3 state).

Methodology 900 begins as shown in step 902 either when power is first provided to BMU 266 from battery cell/s 256, and with a disconnect counter value 259 set to a known initial value (e.g., initial value=zero or any other selected initial value). As shown in FIG. 11, remote console 295 may maintain on non-volatile storage a record of the most recent (last) disconnect counter value 259 of system 200 that is aligned to (or otherwise combined or encrypted with) battery pack 265 manufacturer serial number, and optionally the most recent disconnect counter values of other monitored systems 289 aligned to their respective corresponding respective battery pack manufacturer serial numbers. In this way, a record of previously-transmitted disconnect counter values 259 may be kept remotely by remote console 259, and thus is not subject to being changed by a local attacker on local system 200 without being noticed as incorrect by a user of remote console 295. Further, when the disconnect counter values 259 are aligned, combined or encrypted with a given battery pack 265 manufacturer serial number, a user of remote console 259 can detect an unauthorized replacement of the given battery pack 265 with another unauthorized battery pack (e.g., by a local attacker or other unauthorized person).

After step 902, BMU 266 then determines the status of Sys_Pres signal 291 in step 904. If Sys_Pres signal 291 is determined to be low in step 904, then this means that battery disconnect switch 299 remains closed to conduct the Sys_Pres signal 291 between motherboard 207 and BMU 266, and methodology 900 repeats as shown. However, if Sys_Pres signal 291 is determined in step 904 to have transitioned to high, then this means that battery disconnect switch 299 has opened (e.g., in response to loosening and/or separation of chassis lid chassis lid 301 from opening 311 of chassis enclosure 201) during a chassis intrusion or tampering event. In this event, battery disconnect switch no longer conducts the Sys_Pres signal 291 between motherboard 207 and BMU 266, and methodology 900 proceeds to step 906 where BMU 266 increments the disconnect counter value 259 maintained in BMU register 275 and NVM 255. Any suitable counter technique may be employed, e.g., sequential, randomized or pseudo-random ephemeral secret, etc.

Figure 10:
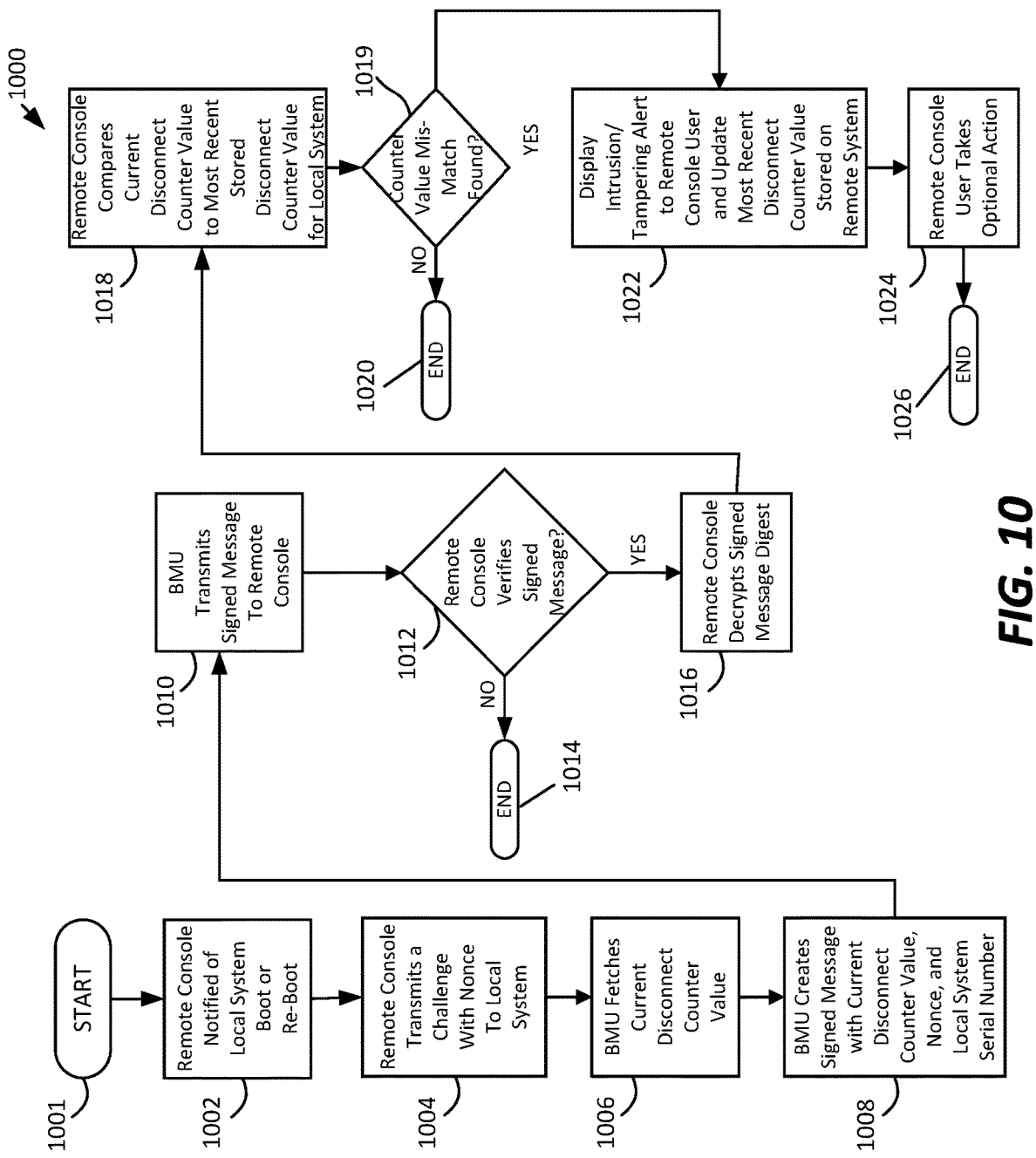
FIG. 10 illustrates methodology according to one exemplary embodiment of the disclosed systems and methods.

FIG. 11 illustrates action/s of methodology 900 as they may be performed by individual components of system 200 or remote console 295 versus time. FIGS. 10 and 11 illustrate one exemplary embodiment of a methodology 1000 that may be implemented by programmable integrated circuit/s of a local system 200 and a remote console 295 to alert a human administrator 1102 of FIG. 11 (e.g., security analyst) who is operating remote console 295 when a chassis intrusion or tampering event has occurred and been previously logged during step 906 of methodology 900 of FIG. 9. Methodology 1000 begins in step 1001 (e.g., upon power up or reboot of system 200), for example, after other steps of a normal boot sequence. In step 1002, a communications software layer interface (Comms SWIF), for example BIOS 231 or application/agent 237, notifies remote console 295 across network 297 that system 200 is booting or has booted. Methodology 1000 then proceeds to step 1004 where remote console 295 transmits a challenge across network 297 to the communication software layer interface 231 or 237 on system 200 as a remote query that may be a nonce-based message signed with a public key. This nonce-based message is communicated from communication software layer interface 231 or 237 to BMU 266 via EC 283 as shown in FIG. 11. Using the nonce-based message may also provide anti-replay protection.

Next, in step 1006, BMU 266 fetches the current disconnect counter value 259 from battery NVM 255 or BMU register 275. Then in step 1008, BMU 266 retrieves and combines the manufacturer serial number of system 200 (e.g., maintained with keys 257 on battery NVM 255) together with the current disconnect counter value 259 and the remote console nonce received in step 1004 into a message. In one embodiment, BMU 266 may sign this message (by encrypting the digest of the hash of the message) with an elliptic-curve cryptography (ECC) private key 257 or other suitable private key that is unique to BMU 266. In an optional embodiment, BMU 266 may encrypt the whole message. In step 1010, BMU 266 then returns this signed message (including the current disconnect counter value 259 and remote console nonce) via EC 283 and communication software layer interface 231 or 237 across network 297 to remote console 295.

In step 1012, remote console 295 first verifies the signed message received from the system 200 using the ECC public key for BMU 266. Alternatively, remote console 295 may decrypt the whole message in step 1012 where the whole message was encrypted by BMU 266 as described above. If the signed message is not verified (or successfully decrypted) in step 1012, then methodology 1000 proceeds to step 1014, where it terminates as shown with an optional failure message displayed to the remote security analyst 1102. However, if the signed message is verified in step 1012, then remote console 295 decrypts the message digest (or whole message where previously encrypted) in step 1016 to determine the current disconnect counter value 259 from the message. The remote console then compares the current disconnect counter value 259 for system 200 to the most recent previous disconnect counter value maintained (stored) on remote console 295 non-volatile memory for system 200 in step 1018. If there is no mismatch found in step 1019 between the current disconnect counter value 259 and the most recent stored disconnect counter value for system 200, then methodology 1000 may terminate in step 1020, and may optionally notify the security analyst 1102 of no intrusion or tampering event found on system 200.

However, if there is a mismatch found in step 1018 between the current disconnect counter value 259 for system 200 and the most recent stored previous disconnect counter value for system 200, then remote console 295 may display and/or provide audio relaying an intrusion/tampering event alert corresponding to system 200 to the remote console human user (e.g., security analyst 1102) in step 1022 and also update the most recent disconnect counter value stored on remote console 295 with the newly received current disconnect counter value 259. The security analyst 1102 may optionally then take a determined appropriate action in step 1024, e.g., such as notifying the local user 802 of the occurrence of an intrusion or tampering event, remotely accessing the system 200 across network 297 to run anti-virus or other endpoint security software scans, device re-detection and/or device enumeration routines, system diagnostics, etc. Methodology 1000 may then end in step 1026. FIG. 11 illustrates action/s of methodology 1000 as they may be performed by individual components of system 200 or remote console 295 versus time.

Figure 12:
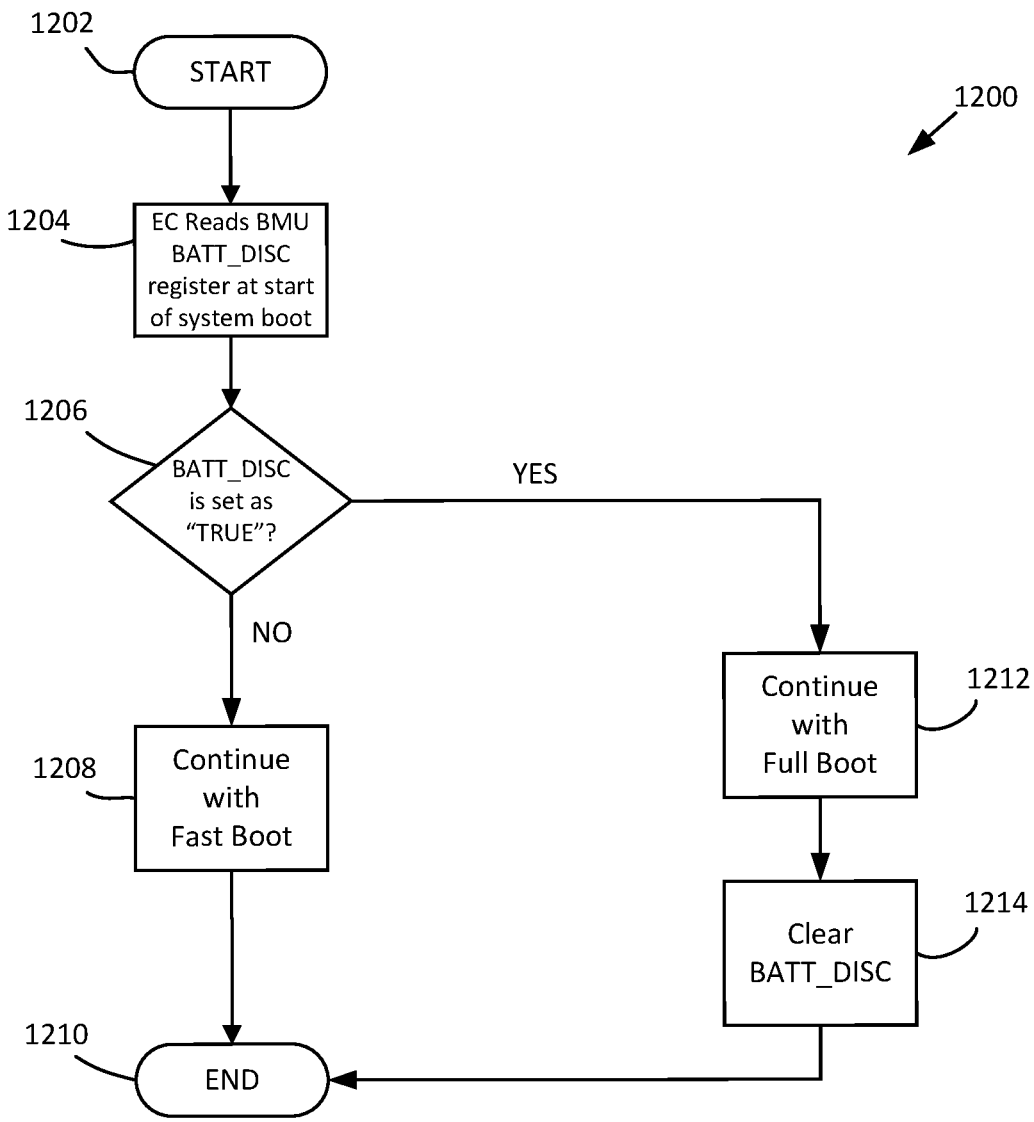
FIG. 12 illustrates methodology according to one exemplary embodiment of the disclosed systems and methods.

FIG. 12 illustrates one exemplary embodiment of a methodology 1200 that may be implemented at system startup or reboot by programmable integrated circuit/s of system 200 to select between a full system boot (e.g., that includes system device detection and device enumeration routines) and a fast system boot that does not include all steps or routines of the full system boot (e.g., that does not include system device detection and device enumeration routines). It will be understood that methodology 1200 may be performed in combination with methodology 700 of FIG. 7

(e.g., sharing the common steps between the two methodologies), or may be performed alone without methodology 700.

Methodology 1200 begins in step 1202 (e.g., upon power up or reboot of system 200). Methodology 1200 then proceeds to step 1204 where BIOS 237 queries EC 283 to cause EC 283 to read the register 275 of BMU 266 to retrieve the value of the Batt_Disc flag value 258 ("Not True" or "True") from register 275. If the Batt_Disc flag value 258 has not been set to "True", then BMU 266 and EC 283 return a Batt_Disc flag value 258 value of "Not True" to BIOS 237 in step 1206, and methodology 1200 proceeds to step 1208 where system 200 continues with execution of a fast system boot routine on host programmable integrated circuit 205, e.g., that does not include system device detection and device enumeration routines since no system hardware device changes could have been made since the last system boot. Methodology 1200 then ends in step 1210 with execution of OS runtime environment.

However, if BMU 266 and EC 283 return a Batt_Disc flag value 258 value of "True" in step 1206 to BIOS 237, then this means that a chassis intrusion or tampering event has occurred since the last system boot, e.g., and has been previously logged in step 606 of methodology 600 of FIG. 6. This indicates that the chassis has been opened or otherwise tampered with either by an authorized person (e.g., to replace and/or add or remove internal system hardware devices) or by a non-authorized person with unknown intent and actions. In this case, BIOS 237 logs the intrusion/tampering event in the BIOS log and then continues in step 1212 with execution of a full system boot routine on host programmable integrated circuit 205 (e.g., including system device detection and device enumeration routines to allow detection of any changes in system hardware device configuration since the last system boot. In step 1214, EC 283 communicates with BMU 266 to cause BMU 266 to clear the Batt_Disc flag value 258 (set Batt_Disc flag value 258 to "Not True"), and methodology proceeds to step 1210 with execution of OS runtime environment as previously described.

It will be understood that the steps of the methodologies shown and described herein are exemplary only, and that any combination of fewer, additional and/or alternative steps may be employed that are suitable for detecting chassis intrusion and/or tampering events in a battery-powered information handling system, and of taking one or more actions and/or modifying system operation in response to detection of such event/s.

It will also be understood that one or more of the tasks, functions, or methodologies described herein for an information handling system or component thereof (e.g., including those described herein for components 205, 220, 266, 280, 283, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

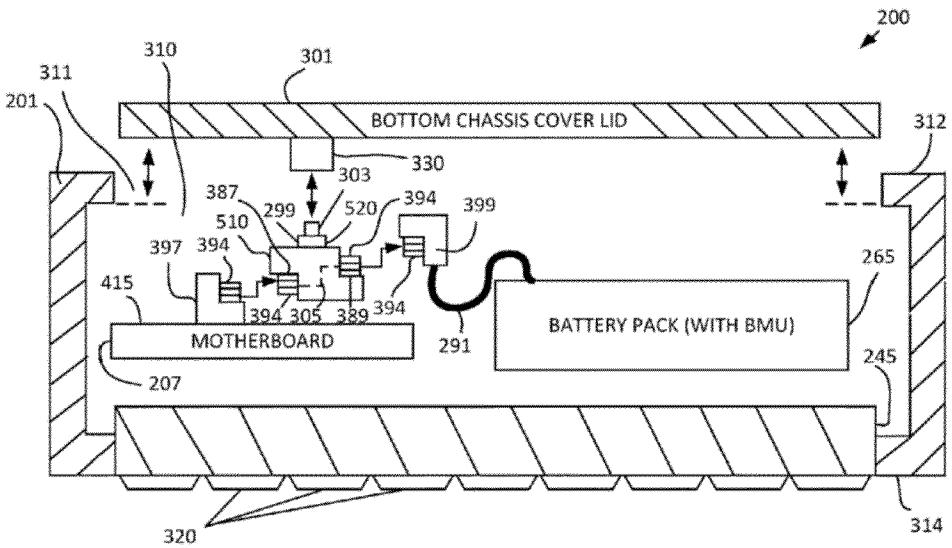

What is claimed is:
1. An information handling system, comprising:
a chassis enclosure having chassis outer walls defining at least one cavity therebetween;
at least one removable chassis lid;

an opening defined in at least one of the chassis outer walls, the opening being complimentary-shaped and sized to receive the chassis lid in a mechanically engaged position to close off the opening;

a switch disposed within the cavity between the chassis outer walls, the switch actuating to provide a system present signal to indicate the presence of the removable chassis lid received in an installed position in the opening and actuating to not provide the system present signal to indicate the absence of the removable chassis lid received in the installed position in the opening; and a battery system disposed within the cavity of the chassis enclosure, the battery system comprising:

one or more rechargeable battery cells providing electrical current to a system load of an information handling system, memory, and at least one programmable integrated circuit coupled to exchange data with the memory and the one or more battery cells, the programmable integrated circuit of the battery system receiving the system present signal from the switch;

where the programmable integrated circuit of the battery system is programmed to:

sense the system present signal provided from the switch, and store an indicator of the absence of the removable chassis lid received in the installed position in the opening in the memory of the battery system upon sensing that the system present signal is not provided; and where the system further comprises:

a member extending from the removable chassis lid into the cavity of the chassis enclosure and actuating the switch to provide the system present signal when the removable chassis lid is received in the installed position in the opening, and the member not actuating the switch so as to not provide the system present signal when the removable chassis lid is not received in the installed position in the opening, and a shim separate from a motherboard and a smart battery pack of the system, the shim being mechanically coupled in fixed position within the cavity of the chassis enclosure; where the switch is mechanically coupled to the shim in a fixed position where it is actuated by physical contact with the member extending from the removable chassis lid when the removable chassis lid is received in the installed position in the opening.

2. The system of claim 1, where the switch is actuated to close by the presence of the removable chassis lid received in the installed position in the opening and where the switch is actuated to open by the absence of the removable chassis lid received in the installed position in the opening, the programmable integrated circuit of the battery system receiving the system present signal through the switch when the switch is closed and not receiving the system present signal through the switch when the switch is opened; and where the programmable integrated circuit of the battery system is programmed to:

sense the interruption of the system present signal provided from the switch, and store an indicator of the system present signal interruption in the memory of the battery system upon sensing that the system present signal is interrupted.

3. The system of claim 1, where the battery system is a self-contained integrated smart battery pack; where the programmable integrated circuit of the battery system is a battery management unit powered by the one or more rechargeable battery cells; and where the programmable memory of the battery system comprises a non-volatile memory (NVM).

4. An information handling system, comprising:

a chassis enclosure having chassis outer walls defining at least one cavity therebetween;

at least one removable chassis lid;

an opening defined in at least one of the chassis outer walls, the opening being complimentary-shaped and sized to receive the chassis lid in a mechanically engaged position to close off the opening;

a switch disposed within the cavity between the chassis outer walls, the switch actuating to provide a system present signal to indicate the presence of the removable chassis lid received in an installed position in the opening and actuating to not provide the system present signal to indicate the absence of the removable chassis lid received in the installed position in the opening; and a battery system disposed within the cavity of the chassis enclosure, the battery system comprising:

one or more rechargeable battery cells providing electrical current to a system load of an information handling system, memory, and at least one programmable integrated circuit coupled to exchange data with the memory and the one or more battery cells, the programmable integrated circuit of the battery system receiving the system present signal from the switch;

where the programmable integrated circuit of the battery system is programmed to:

sense the system present signal provided from the switch, and store an indicator of the absence of the removable chassis lid received in the installed position in the opening in the memory of the battery system upon sensing that the system present signal is not provided;

where the switch is actuated to close by the presence of the removable chassis lid received in the installed position in the opening and where the switch is actuated to open by the absence of the removable chassis lid received in the installed position in the opening, the programmable integrated circuit of the battery system receiving the system present signal through the switch when the switch is closed and not receiving the system present signal through the switch when the switch is opened; and where the programmable integrated circuit of the battery system is programmed to:

sense the interruption of the system present signal provided from the switch, and store an indicator of the system present signal interruption in the memory of the battery system upon sensing that the system present signal is interrupted; and where the system further comprises circuitry disposed within the cavity between the chassis outer walls, the circuitry providing a voltage to the switch and a pin of the programmable integrated circuit that is coupled to the switch; where the programmable integrated circuit of the battery system is programmed to determine the presence of the system present signal by sensing a decreased voltage at the pin of the programmable integrated circuit that is coupled to the switch and to determine the absence of the system present signal by sensing an increased voltage at the pin of the programmable integrated circuit, the switch actuating to provide the system present signal to the pin of the programmable integrated circuit by decreasing the voltage on the pin when the switch is closed and to not provide the system present signal to the pin of the programmable integrated circuit by increasing the voltage on the pin of the programmable integrated circuit of the battery system when the switch is opened.

5. The system of claim 4, where the switch is coupled between the pin and a system ground of the circuitry, the voltage at the pin decreasing due to current flowing to the system ground when the switch is closed.

6. The system of claim 4, further comprising a member extending from the removable chassis lid into the cavity of the chassis enclosure and actuating the switch to provide the system present signal when the removable chassis lid is received in the installed position in the opening, and the member not actuating the switch so as to not provide the system present signal when the removable chassis lid is not received in the installed position in the opening.

7. The system of claim 6, further comprising a shim separate from a motherboard and a smart battery pack of the system, the shim being mechanically coupled in fixed position within the cavity of the chassis enclosure; where the switch is mechanically coupled to the shim in a fixed position where it is actuated by physical contact with the member extending from the removable chassis lid when the removable chassis lid is received in the installed position in the opening.

8. An information handling system, comprising:
a chassis enclosure having chassis outer walls defining at least one cavity therebetween;
at least one removable chassis lid;
an opening defined in at least one of the chassis outer walls, the opening being complimentary-shaped and sized to receive the chassis lid in a mechanically engaged position to close off the opening;
a switch disposed within the cavity between the chassis outer walls, the switch actuating to provide a system present signal to indicate the presence of the removable chassis lid received in an installed position in the opening and actuating to not provide the system present signal to indicate the absence of the removable chassis lid received in the installed position in the opening; and
a battery system disposed within the cavity of the chassis enclosure, the battery system comprising:
one or more rechargeable battery cells providing electrical current to a system load of an information handling system,
memory, and
at least one programmable integrated circuit coupled to exchange data with the memory and the one or more battery cells, the programmable integrated circuit of the battery system receiving the system present signal from the switch:
where the programmable integrated circuit of the battery system is programmed to:
sense the system present signal provided from the switch, and
store an indicator of the absence of the removable chassis lid received in the installed position in the opening in the memory of the battery system upon sensing that the system present signal is not provided;
where the programmable integrated circuit of the battery system is programmed to store the indicator by incrementing a counter in the memory of the battery system upon sensing that the system present signal is not provided; and where the information handling system comprises a second programmable integrated circuit programmed to:
communicate across a network with a programmable integrated circuit of a remote information handling system; and
retrieve the value of the incremented counter from the battery system memory, and transmit the incremented counter value to the remote information handling system.

9. A method, comprising operating a first programmable integrated circuit of a battery system disposed within a cavity defined between chassis outer walls of a chassis enclosure of a first information handling system to:
sense a state of a system present signal provided by a switch disposed within the cavity of the chassis enclosure, the switch actuating to provide the system present signal to indicate the presence of a removable chassis lid received in an installed position in an opening defined in at least one of the chassis outer walls and actuating to not provide the system present signal to indicate the absence of the removable chassis lid received in the installed position in the opening; and
store an indicator of the absence of the removable chassis lid received in the installed position in the opening in a memory of the battery system upon sensing that the system present signal is not provided;
where the battery system comprises one or more rechargeable battery cells providing electrical current to a system load of the first information handling system, the first programmable integrated circuit of the battery system exchanging data with the memory and the one or more battery cells of the battery system; and
where the first information handling system further comprises:
a member extending from the removable chassis lid into the cavity of the chassis enclosure and actuating the switch to provide the system present signal when the removable chassis lid is received in the installed position in the opening, and the member not actuating the switch so as to not provide the system present signal when the removable chassis lid is not received in the installed position in the opening, and
a shim separate from a motherboard and a smart battery pack of the system, the shim being mechanically coupled in fixed position within the cavity of the chassis enclosure; where the switch is mechanically coupled to the shim in a fixed position where it is actuated by physical contact with the member extending from the removable chassis lid when the removable chassis lid is received in the installed position in the opening.

10. The method of claim 9, further comprising:
actuating the switch to close by the presence of the removable chassis lid received in the installed position in the opening, and actuating the switch to open by the absence of the removable chassis lid received in the installed position in the opening; and
operating the first programmable integrated circuit of the battery system to:
receive the system present signal through the switch when the switch is closed and to not receive the system present signal through the switch when the switch is opened, sense the interruption of the system present signal provided from the switch, and store an indicator of the system present signal interruption in the memory of the battery system upon sensing that the system present signal is interrupted.

11. A method, comprising operating a first programmable integrated circuit of a battery system disposed within a cavity defined between chassis outer walls of a chassis enclosure of a first information handling system to:

sense a state of a system present signal provided by a switch disposed within the cavity of the chassis enclosure, the switch actuating to provide the system present signal to indicate the presence of a removable chassis lid received in an installed position in an opening defined in at least one of the chassis outer walls and actuating to not provide the system present signal to indicate the absence of the removable chassis lid received in the installed position in the opening; and store an indicator of the absence of the removable chassis lid received in the installed position in the opening in a memory of the battery system upon sensing that the system present signal is not provided;

where the battery system comprises one or more rechargeable battery cells providing electrical current to a system load of the first information handling system, the first programmable integrated circuit of the battery system exchanging data with the memory and the one or more battery cells of the battery system; and where the method further comprises:

operating the first programmable integrated circuit of the battery system to store the indicator by incrementing a counter in the memory of the battery system upon sensing that the system present signal is not provided, and operating at least one second programmable integrated circuit of the first information handling system that is separate from the battery system to retrieve the current value of the incremented counter from the battery system memory, and transmit the current incremented counter value across a network to at least one third programmable integrated circuit of a second and remote information handling system; and where the method further comprises operating the third programmable integrated circuit of the second remote information handling system to:

receive the transmitted current incremented counter value and compare the received current incremented counter value with a most recent previous transmitted incremented counter value stored in a memory of the second remote information handling system, and provide a notification to a remote system user of the second remote information handling system to indicate the occurrence of a chassis intrusion and/or tampering event on the first information handling system only if the received current incremented counter value does not match the most recent previous transmitted incremented counter value, and update the counter value stored in the memory of the second remote information handling system with the received current incremented counter value.

12. The method of claim 11, further comprising causing a member extending from the removable chassis lid into the cavity of the chassis enclosure to actuate the switch to provide the system present signal when the removable chassis lid is received in the installed position in the opening, and causing the member extending from the removable chassis lid to not actuate the switch so as to not provide the system present signal when the removable chassis lid is not received in the installed position in the opening.

13. The method of claim 11, further comprising:

operating the at least one second programmable integrated of the first information handling system to transmit a boot notification to the at least one third programmable integrated circuit upon occurrence of every boot or re-boot of the first information handling system;

operating the at least one third programmable integrated circuit of the second information handling system to respond to receipt of the boot notification from the at least one second programmable integrated circuit by transmitting a challenge including a nonce across the network to the at least one second programmable integrated circuit;

operating the at least one second programmable integrated circuit of the first information handling system to respond to receipt of the challenge from the at least one third programmable integrated circuit by creating a signed message including at least the nonce and the current incremented counter value stored in the memory of the battery system, and transmitting the signed message across the network to the at least one third programmable integrated circuit of the second information handling system; and operating the at least one third programmable integrated circuit of the second information handling system to respond to receipt of the signed message by verifying the signed message and decrypting the current incremented counter value from the signed message.

* * * * *

UNITED STATES PATENT AND TRADEMARK OFFICE
CERTIFICATE OF CORRECTION

PATENT NO. : 11,495,121 B2
APPLICATION NO. : 16/746260
DATED : November 8, 2022
INVENTOR(S) : Grobelny et al.

It is certified that error appears in the above-identified patent and that said Letters Patent is hereby corrected as shown below:

On the Title Page

Under abstract "13 Claims, 15 Drawing Sheets" should read --17 Claims, 15 Drawing Sheets-- as attached.

In the Claims

Insert the following claims after Claim 13, Column 26, Line 49:
--14. The system of claim 1, where the programmable integrated circuit of the battery system is programmed to store the indicator by setting a flag in the memory of the battery system upon sensing that the system present signal is not provided from the switch; and where the system further comprises at least one second programmable integrated circuit that is separate from the battery system, the second programmable integrated circuit being programmed to:
    read the memory of the battery system to determine whether or not the flag is currently set in the memory of the battery system, and
    then provide a notification to a local system user indicating the occurrence of a chassis intrusion and/or tampering event only if the flag is found present in the memory of the battery system.
15. The system of claim 1, where the programmable integrated circuit of the battery system is programmed to store the indicator by setting a flag in the memory of the battery system upon sensing that the system present signal is not provided from the switch; and where the system further comprises at least one second programmable integrated circuit that is separate from the battery system, the second programmable integrated circuit being programmed to:
    read the memory of the battery system at the initiation of each system boot or system re-boot of the first information handling system to determine whether or not the flag is currently set in the memory of the battery system; and then only one of:
        then boot the information handling system by executing a full system boot routine if the flag is determined to be currently set in the memory of the battery system, or
        then boot the information handling system by executing a fast system boot Signed and Sealed this
Twenty-fifth Day of July, 2023

*Katherine Kelly Vidal*

Katherine Kelly Vidal
*Director of the United States Patent and Trademark Office*

CERTIFICATE OF CORRECTION (continued)
U.S. Pat. No. 11,495,121 B2 routine that includes a number of boot operations that is less than a number of boot operations of the full system boot routine if the flag is determined not to be currently set in the memory of the battery system.

16. The method of claim 9, further comprising operating the first programmable integrated circuit of the battery system to store the indicator by setting a flag in the memory of the battery system upon sensing that the system present signal is not provided from the switch; and operating a second programmable integrated circuit of the first information handling system that is separate from the battery system to:

read the memory of the battery system to determine whether or not the flag is currently set in the memory of the battery system; and then provide a notification to a local system user of the first information handling system to indicate the occurrence of a chassis intrusion and/or tampering event only if the flag is found present in the memory of the battery system.

17. The method of claim 9, further comprising operating the first programmable integrated circuit of the battery system to store the indicator by setting a flag in the memory of the battery system upon sensing that the system present signal is not provided from the switch; and then operating a second programmable integrated circuit of the first information handling system that is separate from the battery system to:

read the memory of the battery system at the initiation of each system boot or system re-boot of the first information handling system to determine whether or not the flag is currently set in the memory of the battery system; and then only one of:

then boot the information handling system by executing a full system boot routine if the flag is determined to be currently set in the memory of the battery system, or then boot the information handling system by executing a fast system boot routine that includes a number of boot operations that is less than a number of boot operations of the full system boot routine if the flag is determined not to be currently set in the memory of the battery system.--.

CERTIFICATE OF CORRECTION (continued)

(12) United States Patent
Grobelny et al.

(10) Patent No.: US 11,495,121 B2
(45) Date of Patent: Nov. 8, 2022

(54) SYSTEMS AND METHODS FOR DETECTING CHASSIS INTRUSION AND/OR TAMPERING EVENTS IN BATTERY-POWERED INFORMATION HANDLING SYSTEMS

(71) Applicant: DELL PRODUCTS L.P., Round Rock, TX (US)

(72) Inventors: Nicholas D. Grobelny, Austin, TX (US); Geroncio O. Tan, Austin, TX (US); Richard C. Thompson, Cedar Park, TX (US); Adolfo S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 198 days.

(21) Appl. No.: 16/746,260

(22) Filed: Jan. 17, 2020

(65) Prior Publication Data

US 2021/0225159 A1    Jul. 22, 2021

(51) Int. Cl.
*G08B 29/16* (2006.01)
*G08B 21/18* (2006.01)
*H01M 50/20* (2021.01)
*G06F 9/4401* (2018.01)

(52) U.S. Cl.
CPC .......... *G08B 29/16* (2013.01); *G06F 9/4401* (2013.01); *G08B 21/18* (2013.01); *H01M 50/20* (2021.01)

(58) Field of Classification Search
CPC ....... G08B 29/16; G08B 21/18; H01M 50/20; G06F 9/4401
See application file for complete search history.

(56) References Cited

U.S. PATENT DOCUMENTS

| | | |
|---|---|---|
| 6,191,503 B1 | 2/2001 | Kitten et al. |
| 6,564,276 B1 * | 5/2003 | Tyner .................. G06F 21/71 710/260 |
| 7,436,149 B2 | 10/2008 | Luo et al. |

(Continued)

OTHER PUBLICATIONS

Tan et al., "Systems And Methods For Detecting Battery Removal While An Information Handling System Is In An Off State", U.S. Appl. No. 16/864,933, filed May 1, 2020, 45 pgs.

*Primary Examiner* — Kam Wan Ma
(74) *Attorney, Agent, or Firm* — Egan, Enders & Huston LLP.

(57) ABSTRACT

Systems and methods that may be implemented to employ a programmable integrated circuit within a smart battery pack to detect and/or log occurrence of chassis intrusion and/or tampering events in a battery-powered information handling system within which the smart battery pack is installed. A battery management unit (BMU) or other programmable integrated circuit of the installed smart battery pack may be utilized to detect occurrence of a tampering and/or intrusion event into the chassis of the host information handling system based on a current state of a system present (Sys_Pres) signal at the battery pack that indicates temporary or permanent disconnection of system motherboard circuitry from the smart battery pack of the battery-powered information handling system. Such a detected occurrence of a tampering and/or intrusion event may be reported to a remote human user of remote system and/or to a local human user of the local system.

17 Claims, 15 Drawing Sheets